US012581433B2

(12) United States Patent
Takeda et al.

(10) Patent No.: US 12,581,433 B2
(45) Date of Patent: Mar. 17, 2026

(54) METHODS AND APPARATUS TO FACILITATE DUAL CONNECTIVITY POWER CONTROL MODE

(71) Applicant: QUALCOMM Incorporated, San Diego, CA (US)

(72) Inventors: Kazuki Takeda, Tokyo (JP); Seyedkianoush Hosseini, San Diego, CA (US); Peter Gaal, San Diego, CA (US); Wanshi Chen, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/754,645

(22) PCT Filed: Sep. 22, 2020

(86) PCT No.: PCT/CN2020/116668
§ 371 (c)(1),
(2) Date: Apr. 7, 2022

(87) PCT Pub. No.: WO2021/088542
PCT Pub. Date: May 14, 2021

(65) Prior Publication Data
US 2023/0134316 A1 May 4, 2023

(30) Foreign Application Priority Data
Nov. 8, 2019 (WO) ................ PCT/CN2019/116785

(51) Int. Cl.
*H04W 52/36* (2009.01)
*H04W 52/42* (2009.01)
(52) U.S. Cl.
CPC ......... *H04W 52/42* (2013.01); *H04W 52/367* (2013.01)

(58) Field of Classification Search
CPC ............ H04W 52/00; H04W 52/0203; H04W 52/0206; H04W 52/0212; H04W 52/0222;
(Continued)

(56) References Cited

U.S. PATENT DOCUMENTS 11,246,103 B2 * 2/2022 Frank .................... H04W 24/10
2017/0150452 A1 * 5/2017 Rosa ................... H04W 52/226
(Continued)

FOREIGN PATENT DOCUMENTS

CN 104349443 A 2/2015
CN 106233804 A 12/2016
(Continued)

OTHER PUBLICATIONS

Ericsson: "NR-DC Power Control", 3GPP TSG-RAN WG2 #107bis, R2-1912542, Oct. 18, 2019 (Oct. 18, 2019) pp. 1-4.
(Continued)

*Primary Examiner* — Matthew W Genack
(74) *Attorney, Agent, or Firm* — ArentF ox Schiff, LLP

(57) ABSTRACT

Apparatus, methods, and computer-readable media for facilitating dual connectivity power control mode are disclosed herein. An example method for wireless communication of a wireless device at a user equipment (UE) includes connecting to an MCG on a first set of MCG serving cells within a first frequency range (FR1) and a second set of MCG serving cells within a second frequency range (FR2), and connecting to an SCG on a first set of SCG serving cells within the FR1 and a second set of SCG bands within the FR2. The example method also includes receiving a transmit power configuration for power control mode for both FR1 and FR2. The example method also includes transmitting to at least one of the MCG serving cells or the SCG serving cells with a transmit power determined based on the transmit power configuration.

28 Claims, 13 Drawing Sheets

(58) Field of Classification Search

CPC ..... H04W 52/30; H04W 52/32; H04W 52/34; H04W 52/365; H04W 52/367; H04W 52/38; H04W 52/386; H04W 52/42; H04W 52/54

See application file for complete search history.

(56) References Cited

U.S. PATENT DOCUMENTS

| | | | | |
|---|---|---|---|---|
| 2018/0310257 A1 * | 10/2018 | Papasakellariou .. | H04W 52/242 |
| 2019/0246358 A1 * | 8/2019 | Wang ................. | H04W 52/146 |
| 2021/0227610 A1 * | 7/2021 | Cui ...................... | H04W 76/15 |

FOREIGN PATENT DOCUMENTS

| | | | |
|---|---|---|---|
| CN | 107889209 A | 4/2018 |
| CN | 109152030 A | 1/2019 |
| CN | 109309954 A | 2/2019 |
| CN | 110167123 A | 8/2019 |
| WO | 2016074883 A1 | 5/2016 |
| WO | 2017035464 A1 | 3/2017 |

OTHER PUBLICATIONS

Intel Corporation: "Feature Lead Summary for Uplink Power Control for Supporting NN-DC", 3GPP TSG-RAN WG1 # 97, R1-1907731, May 17, 2019 (May 17, 2019), 17 pages, the whole document.

International Search Report and Written Opinion—PCT/CN2019/116785—ISA/EPO—Jul. 27, 2020.

International Search Report and Written Opinion—PCT/CN2020/116668—ISA/EPO—Dec. 15, 2020.

VIVO: "Power Control for NR-DC", 3GPP TSG-RAN WG2 Meeting#107bis, R2-1912269, Oct. 18, 2019 (Oct. 18, 2019), 4 pages, the whole document.

Apple Inc: "Feature Lead Summary #1 for Uplink Power Control for Supporting NN-DC", 3GPP TSG-RAN WG1 #98, R1-1909619, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019, XP051766215, 19 Pages, Table 2.

Ericsson: "NR-DC Power Control", 3GPP TSG-RAN WG2 #108, R2-1915372, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 7, 2019, XP051815889, pp. 1-4, Sections 1, 2.1 and 2.2.

Supplementary European Search Report—EP20884860—Search Authority—The Hague—Oct. 25, 2023.

* cited by examiner

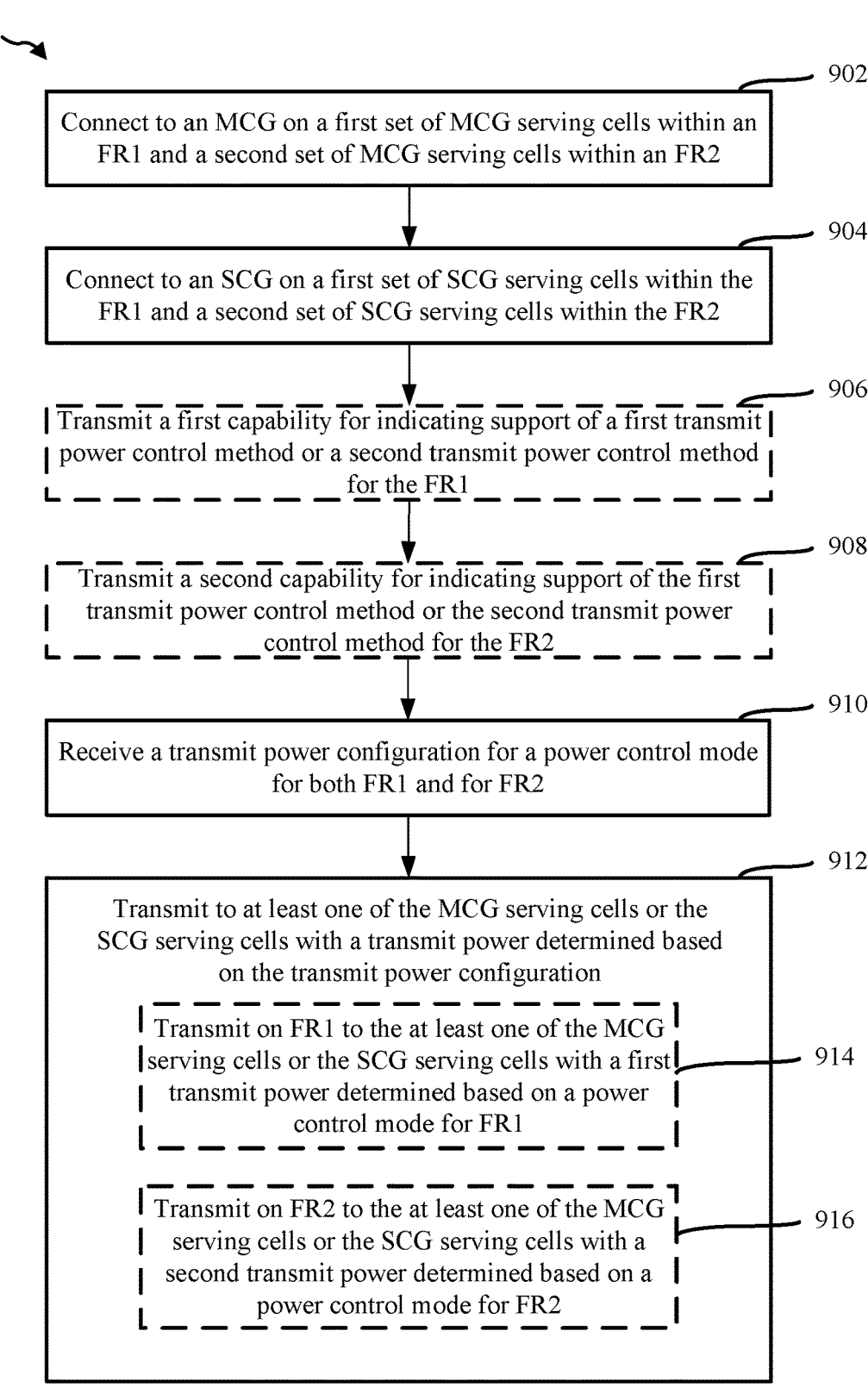

900

902

Connect to an MCG on a first set of MCG serving cells within an FR1 and a second set of MCG serving cells within an FR2

904

Connect to an SCG on a first set of SCG serving cells within the FR1 and a second set of SCG serving cells within the FR2

906

Transmit a first capability for indicating support of a first transmit power control method or a second transmit power control method for the FR1

908

Transmit a second capability for indicating support of the first transmit power control method or the second transmit power control method for the FR2

910

Receive a transmit power configuration for a power control mode for both FR1 and for FR2

912

Transmit to at least one of the MCG serving cells or the SCG serving cells with a transmit power determined based on the transmit power configuration

914

Transmit on FR1 to the at least one of the MCG serving cells or the SCG serving cells with a first transmit power determined based on a power control mode for FR1

916

Transmit on FR2 to the at least one of the MCG serving cells or the SCG serving cells with a second transmit power determined based on a power control mode for FR2

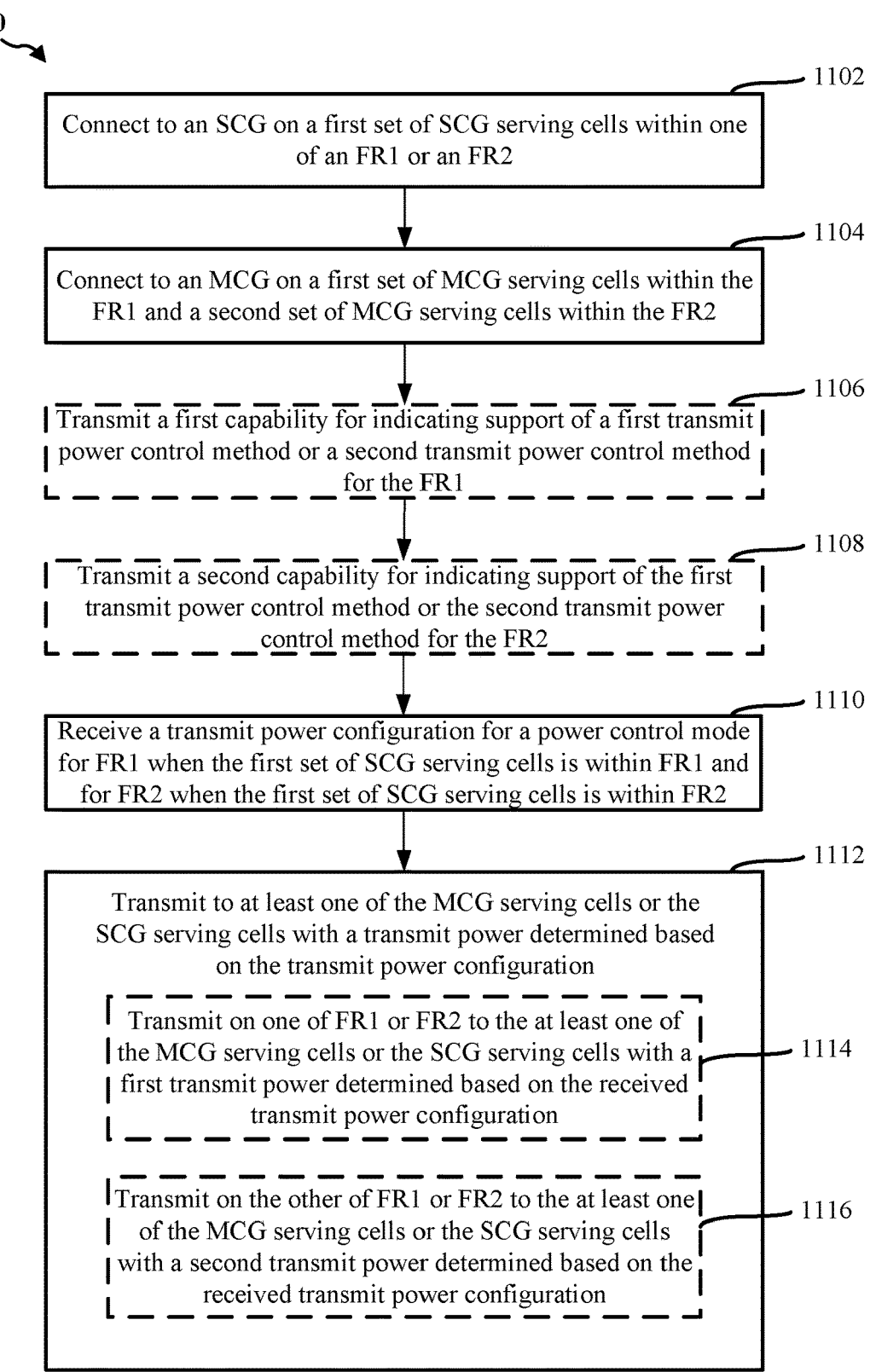

1102

Connect to an SCG on a first set of SCG serving cells within one of an FR1 or an FR2

1104

Connect to an MCG on a first set of MCG serving cells within the FR1 and a second set of MCG serving cells within the FR2

1106

Transmit a first capability for indicating support of a first transmit power control method or a second transmit power control method for the FR1

1108

Transmit a second capability for indicating support of the first transmit power control method or the second transmit power control method for the FR2

1110

Receive a transmit power configuration for a power control mode for FR1 when the first set of SCG serving cells is within FR1 and for FR2 when the first set of SCG serving cells is within FR2

1112

Transmit to at least one of the MCG serving cells or the SCG serving cells with a transmit power determined based on the transmit power configuration

1114

Transmit on one of FR1 or FR2 to the at least one of the MCG serving cells or the SCG serving cells with a first transmit power determined based on the received transmit power configuration

1116

Transmit on the other of FR1 or FR2 to the at least one of the MCG serving cells or the SCG serving cells with a second transmit power determined based on the received transmit power configuration

FIG. 11

METHODS AND APPARATUS TO FACILITATE DUAL CONNECTIVITY POWER CONTROL MODE

CROSS REFERENCE TO RELATED APPLICATION(S)

This application is a 35 U.S.C. § 371 National Phase of Patent Cooperation Treaty International Application Serial No. PCT/CN2020/116668, entitled "METHODS AND APPARATUS TO FACILITATE DUAL CONNECTIVITY POWER CONTROL MODE" and filed on Sep. 22, 2020, which claims the benefit of Patent Cooperation Treaty International Application Serial No. PCT/CN2019/116785, entitled "METHODS AND APPARATUS TO FACILITATE DUAL CONNECTIVITY POWER CONTROL MODE" and filed on Nov. 8, 2019, all of which are expressly incorporated by reference herein in their entirety.

BACKGROUND

Technical Field

The present disclosure relates generally to communication systems, and more particularly, to power control modes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, a wireless device (e.g., a user equipment (UE)) may be connected to more than one network entity at a time. For example, a UE configured for dual connectivity may be connected to two different base stations, and each base station may include a cell group. In some such examples, each cell group may include one or more serving cells (sometimes referred to as "carriers"). A master cell group (MCG) is a cell group that includes at least a primary serving cell and may also include one or more secondary serving cells (e.g., the MCG may include a primary serving cell and zero or more secondary serving cell). A secondary cell group (SCG) is a cell group that includes one or more additional serving cells.

In some examples, for each cell group, the UE may include one or more carriers for transmitting data and/or control information from the UE to the respective cell group. In some such examples, the one or more carriers for each cell group may operate with respective transmit powers. For example, the UE may transmit an uplink transmission to the MCG using an MCG transmit power and the UE may transmit an uplink transmission to the SCG using an SCG transmit power.

Example techniques disclosed herein facilitate power control sharing for uplink transmissions for a UE that is connected to two cell groups (e.g., an MCG and an SCG) and that is connected to at least one cell group using at least one carrier located in a first frequency range (FR1) and at least one carrier located in a second frequency range (FR2). For example, in a first example scenario, the UE may be connected to the MCG using one or more carriers in FR1 and one or more carriers in FR2 and may also be connected to the SCG using one or more carriers in FR1 and one or more carriers in FR2. In a second example scenario, the UE may be connected to the MCG using one or more carriers in a frequency range (e.g., in FR1 or in FR2) and may also be connected to the SCG using one or more carriers in FR1 and one or more carriers in FR2. In a third example scenario, the UE may be connected to the MCG using one or more carriers in FR1 and one or more carriers in FR2 and may also be connected to the SCG using one or more carriers in a frequency range (e.g., in FR1 or in FR2). Thus, it should be appreciated that in some examples, the MCG carriers and the SCG carriers may overlap for at least one of the frequency ranges (e.g., in the second and third example scenarios) or may overlap for both frequency ranges (e.g., in the first example scenario).

In an aspect of the disclosure, a method, a computer-readable medium, and an apparatus are provided. An example apparatus for wireless communication of a wireless device at a UE connects to an MCG on a first set of MCG serving cells within a first frequency range (FR1) and a second set of MCG serving cells within a second frequency range (FR2), and connecting to an SCG on a first set of SCG serving cells within the FR1 and a second set of SCG bands within the FR2. The example apparatus also receives a transmit power configuration including an FR1 power control mode and an FR2 power control mode. The example apparatus also transmits to at least one of the MCG serving cells or the SCG serving cells in FR1 and FR2 with a transmit power determined based on the respective transmit power configuration. For example, the apparatus may transmit in FR1 with a transmit power determined based on the FR1 power control mode and may transmit in FR2 with a transmit power determined based on the FR2 power control mode. It should be appreciated that in some examples, the FR1 power control mode may be the same as the FR2 power control mode, and that in other examples, the FR1 power control mode may be different than the FR2 power control mode.

In another aspect of the disclosure, a method, a computer-readable medium, and an apparatus are provided. An example apparatus for wireless communication of a wireless device at a UE connects to an MCG on a first set of MCG serving cells within one of a first frequency range (FR1) or a second frequency range (FR2), and connecting to an SCG on a first set of SCG serving cells within the FR1 and a second set of SCG serving cells within the FR2. The example apparatus also receives a transmit power configuration for a power control mode for FR1 when the first set of MCG serving cells is within FR1 and for FR2 when the first set of MCG serving cells is within FR2. The example apparatus also transmits to at least one of the MCG serving cells or the SCG serving cells in FR1 when the first set of MCG serving cells is within FR1 with a transmit power determined based on the transmit power configuration, or in FR2 when the first set of MCG serving cells is within FR2 with a transmit power determined based on the transmit power configuration.

In another aspect of the disclosure, a method, a computer-readable medium, and an apparatus are provided. An example apparatus for wireless communication of a wireless device at a UE connects to an SCG on a first set of SCG serving cells within one of a first frequency range (FR1) or a second frequency range (FR2), and connecting to an MCG on a first set of MCG serving cells within the FR1 and a second set of MCG serving cells within the FR2. The example apparatus also receives a transmit power configuration for a power control mode for FR1 when the first set of SCG serving cells is within FR1 and for FR2 when the first set of SCG serving cells is within FR2. The example apparatus also transmits to at least one of the MCG serving cells or the SCG serving cells with a transmit power determined based on the transmit power configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 9 to 11 are example flowcharts of example methods of wireless communication of a wireless device at a UE.

DETAILED DESCRIPTION

Figure 1:
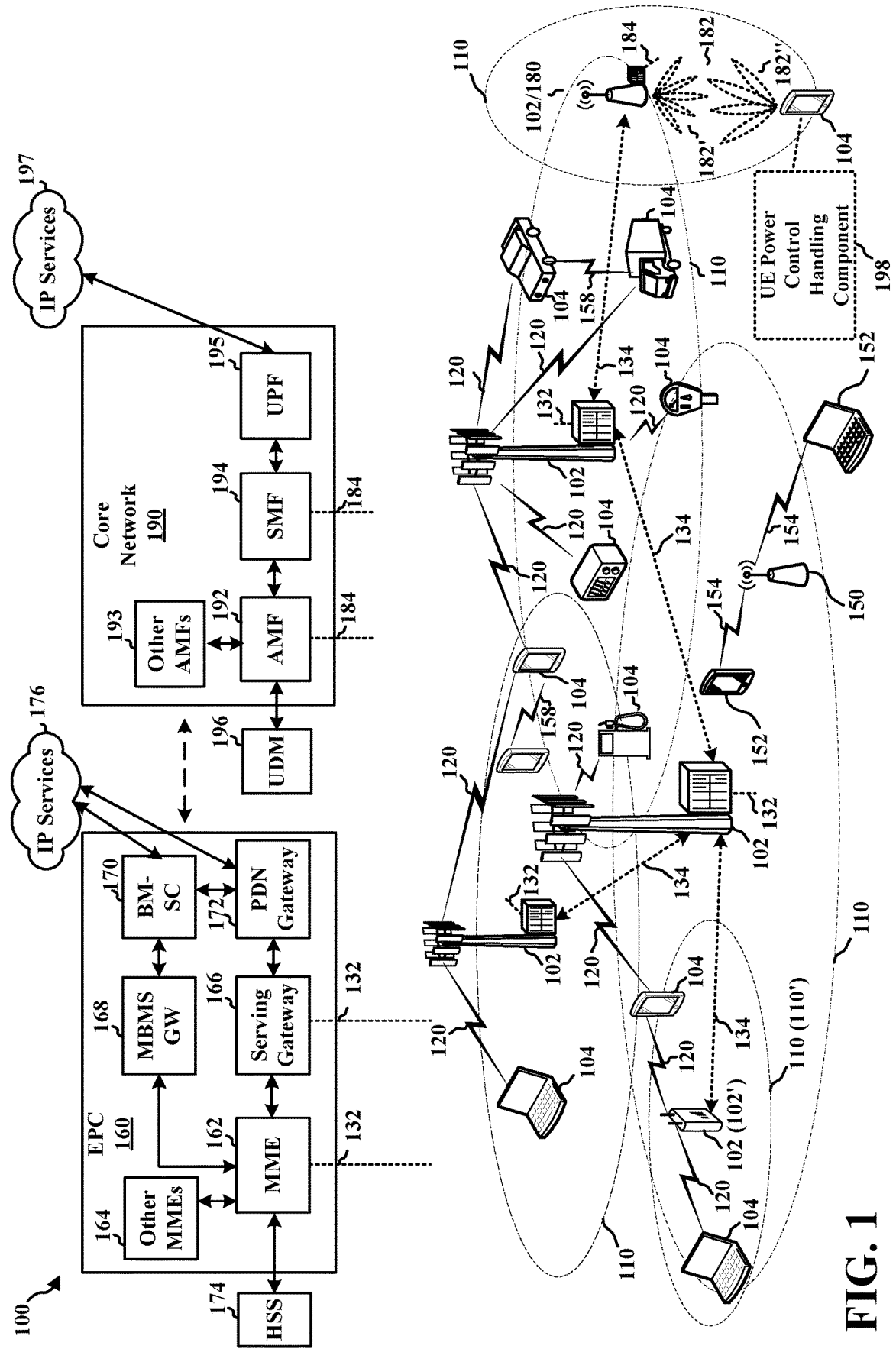
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via power control sharing for cell groups with serving cells (or carriers) located within different frequency ranges. As an example, in FIG. 1, the UE 104 may include a UE power control handling component 198 configured to connect to an MCG on a first set of MCG serving cells (or carriers) within a first frequency range (FR1) and a second set of MCG serving cells within a second frequency range (FR2), and to connect to a secondary cell group (SCG) on a first set of SCG serving cells within the FR1 and a second set of SCG bands within the FR2. For example, the FR1 band may include a sub-6 gigahertz (GHz) frequency band and the FR2 band may include a millimeter wave (mmW) frequency band. The example UE power control handling component 198 may also be configured to receive a transmit power configuration for power control mode for both FR1 and FR2. The example UE power control handling component 198 may also be configured to transmit to at least one of the MCG serving cells or the SCG serving cells with a transmit power determined based on the transmit power configuration.

In some examples, the UE power control handling component 198 may be configured to connect to an MCG on a first set of MCG serving cells within one of a first frequency range (FR1) or a second frequency range (FR2), and to connect to an SCG on a first set of SCG serving cells within the FR1 and a second set of SCG serving cells within the FR2. The example UE power control handling component 198 may also be configured to receive a transmit power configuration for a power control mode for FR1 when the first set of MCG serving cells is within FR1 and for FR2 when the first set of MCG serving cells is within FR2. The example UE power control handling component 198 may also be configured to transmit to at least one of the MCG serving cells or the SCG serving cells with a transmit power determined based on the transmit power configuration.

In some examples, the UE power control handling component 198 may be configured to connect to an SCG on a first set of SCG serving cells within one of a first frequency range (FR1) or a second frequency range (FR2), and to connect to an MCG on a first set of MCG serving cells within the FR1 and a second set of MCG serving cells within the FR2. The example UE power control handling component 198 may also be configured to receive a transmit power configuration for a power control mode for FR1 when the first set of SCG serving cells is within FR1 and for FR2 when the first set of SCG serving cells is within FR2. The example UE power control handling component 198 may also be configured to transmit to at least one of the MCG serving cells or the SCG serving cells with a transmit power determined based on the transmit power configuration.

Although the following description may provide examples based on 5G/NR, it should be appreciated that the concepts described herein may be applicable to other communication technologies. For example, the concepts described herein may be applicable to LTE, LTE-A, CDMA, GSM, and/or other wireless technologies (or RATs) in which a UE is configured for dual connectivity with a first cell group and a second cell group and includes at least one carrier within a first frequency range and at least one carrier within a second frequency range for at least one of the cell groups.

Figures 2A, 2B, 2C, 2D:
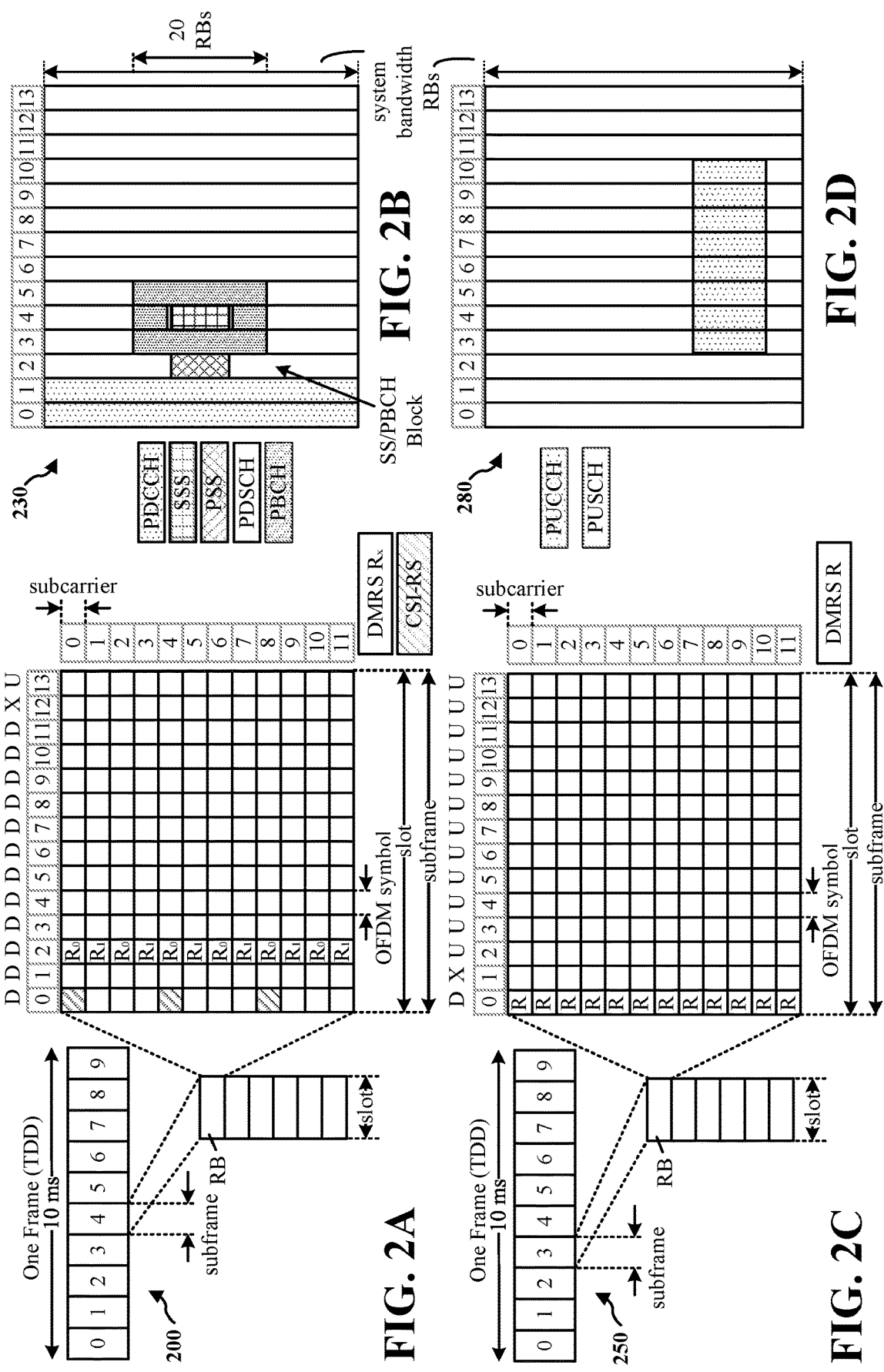
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe.

Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \cdot 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A to 2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
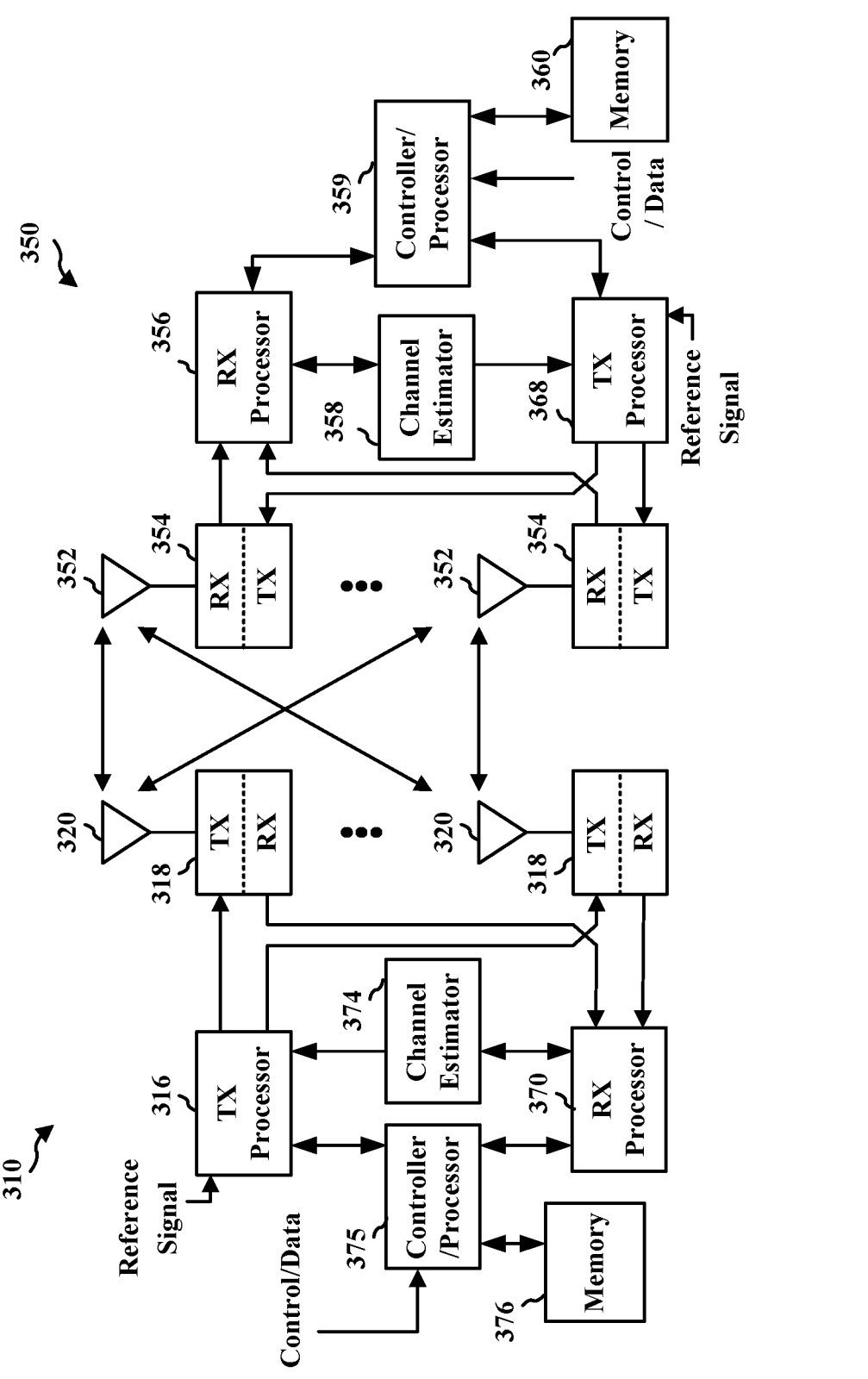
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the example UE power control handling component 198 of FIG. 1.

In some examples, a wireless device (e.g., a user equipment (UE)) may be connected to more than one network entity at a time. For example, a UE configured for dual connectivity may be connected to two different base stations, and each base station may include a cell group. In some such examples, each cell group may include one or more serving cells (sometimes referred to as "carriers"). A master cell group (MCG) is a cell group that includes at least a primary serving cell and may also include one or more secondary serving cells. A secondary cell group (SCG) is a cell group that includes one or more additional serving cells. In some examples, the UE may communicate with the MCG via a primary serving cell of the MCG (e.g., an MCG primary serving cell or "MCG PCell"). The UE may also communicate with the SCG via a serving cell of the SCG (e.g., a secondary serving cell or a secondary cell). In some examples, the SCG may be non-collocated with the MCG. For example, the SCG may be disparate from the MCG and both cell groups may be connected via a communication link.

Figure 4:
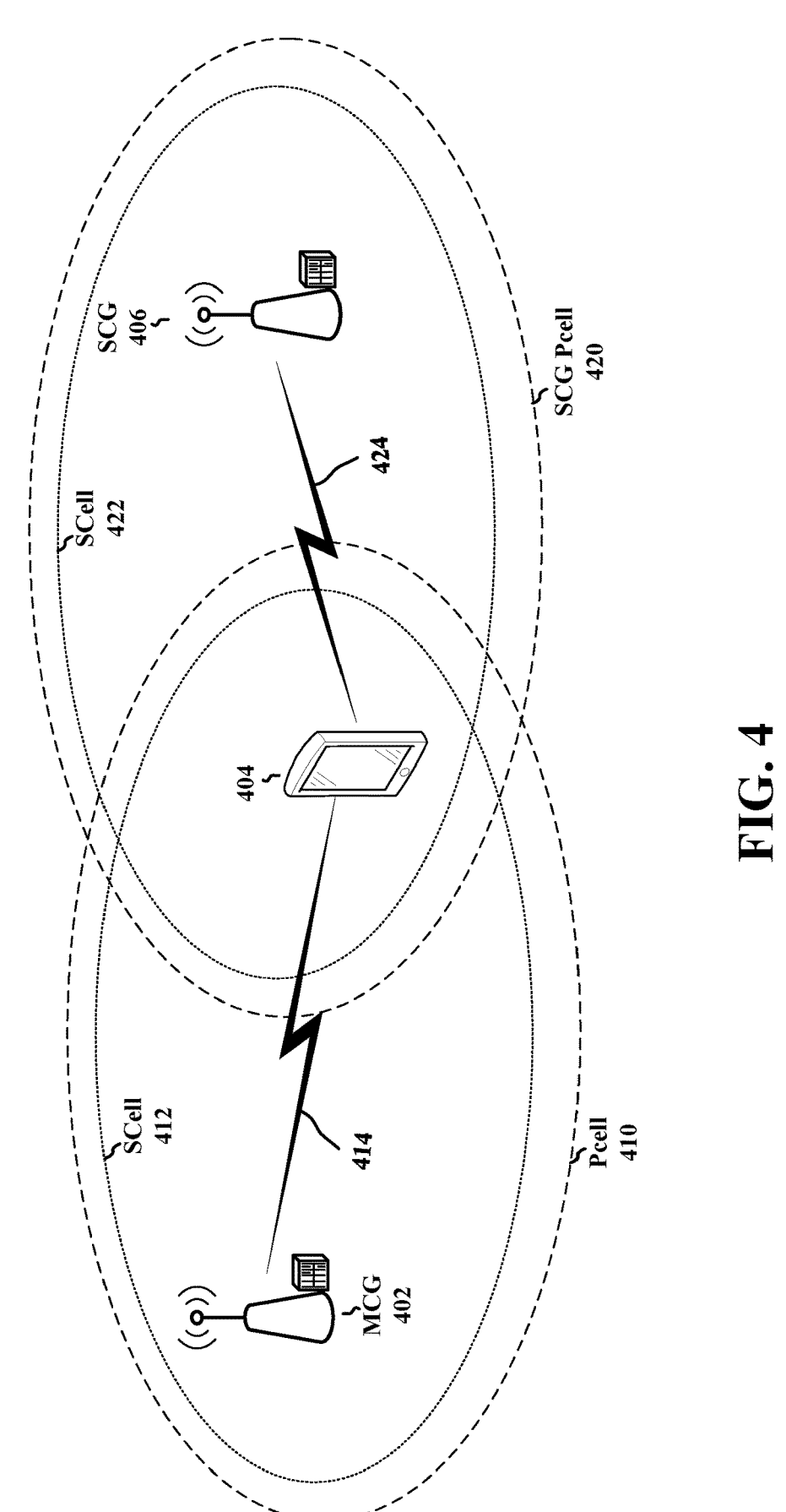
FIG. 4 is a diagram illustrating an example wireless communication system, in accordance with the teachings disclosed herein.

FIG. 4 illustrates an example wireless communication system 400, in accordance with the teachings disclosed herein. The example wireless communication system 400 of FIG. 4 includes a master base station 402 including a set or group of serving cells (sometimes referred to as a "master cell group" (MCG)) that may be configured to serve a UE 404. The MCG 402 may include a primary serving cell (PCell) 410 and one or more secondary serving cells (SCell) 412. The example wireless communication system 400 of FIG. 4 also includes a secondary base station 406 including a set or group of serving cells (sometimes referred to as a "secondary cell group" (SCG)) that may be configured to serve the UE 404. The SCG 406 may include a primary serving cell (SCG PCell) 420 and one or more secondary serving cells (SCell) 422. In the illustrated example, the UE 404 may communicate with the MCG 402 via a first communication link 414 and may communicate with the SCG 406 via a second communication link 424.

In the illustrated example of FIG. 4, the MCG 402 includes one secondary serving cell 412 and the SCG 406 includes one secondary serving cell 422 for clarity. However, it should be appreciated that in additional or alternative examples, the MCG 402 and/or the SCG 406 may include any reasonable quantity of secondary serving cells. For example, the MCG 402 may include zero, one, two, three, etc. secondary serving cells.

In the illustrated example, the UE 404 may be configured to operate with dual connectivity when the UE 404 is connected to the MCG 402 and the SCG 406. In some examples, to facilitate dual connectivity at the UE 404, the UE 404 may be configured to include two modems. In some such examples, the first modem may be configured to connect with a first cell group (e.g., the MCG 402) and the second modem may be configured to connect with a second cell group (e.g., the SCG 406). As used herein, the term "modem" generally refers to the TX processor 368, the RX processor 356, and the controller/processor 359 of the UE 350 of FIG. 3.

In some examples in which the UE 404 includes two modems, information from one modem to the other modem may not be shared and/or may not be shared in a timely-manner. For example, the first modem may not be able to determine whether the second modem is transmitting an uplink transmission to the SCG 406 and/or the second modem may not be able to determine whether the first modem is transmitting an uplink transmission to the SCG 406.

In some examples, to facilitate dual connectivity at the UE 404, the UE 404 may be configured to include a single modem. In some examples, the single modem of the UE 404 may be configured to enable the UE 404 to connect to the first cell group (e.g., the MCG 402) and to connect to the second cell group (e.g., the SCG 406). In some such examples, information regarding each connection may be shared across the modem. For example, the UE 404 may be able to determine whether the UE 404 is transmitting an uplink transmission to the MCG 402 and/or transmitting an uplink transmission to the SCG 406.

In some examples, each cell group (e.g., the MCG and the SCG) connected to the UE may transmit respective transmit power control (TPC) commands to the UE. The TPC command may indicate a maximum transmit power that the UE may apply to a transmission when, for example, transmitting an uplink transmission to the respective cell group. For example, the MCG may transmit an MCG TPC command to the UE to configure a maximum transmit power that the UE may apply to an uplink transmission when transmitting to the MCG. Similarly, the SCG may transmit an SCG TPC command to the UE to configure a maximum transmit power that the UE may apply to an uplink transmission when transmitting to the SCG.

However, it should be appreciated that in some examples, the UE 404 may receive respective grants of uplink resources for uplink transmissions to the MCG 402 and the SCG 406. In some such examples, the UE 404 may determine that a transmit power to transmit the uplink transmissions may exceed a maximum transmit power threshold of the UE. For example, the combined transmit power for the MCG uplink transmission and the SCG uplink transmission may exceed a maximum transmit power of the UE (e.g., 23 dB).

Accordingly, disclosed examples provide techniques for employing power sharing for uplink transmissions for a UE. In some examples, the UE may be configured with semi-static power sharing techniques. In some examples, the UE may be configured with dynamic power sharing techniques.

As described above, in some examples, the UE 404 may include two modems to facilitate dual-connectivity. In some such examples, information corresponding to the first modem may not be available and/or may not be available in a timely-manner to the second modem, and vice versa. Accordingly, semi-static power sharing techniques may be employed for a UE in which information from a first modem may not be shared in a timely-manner with the other modem. For example, when a UE is configured with semi-static power sharing techniques, each modem of the UE controls its respective transmit power control using semi-static information that may be available to each modem.

In some examples, the semi-static information may include respective transmit powers for each cell group and the sum of the respective transmit powers may be configured to not exceed the maximum transmit power threshold of the UE (e.g., 23 dB). For example, the UE 404 may be configured with an MCG transmit power to use when transmitting an uplink transmission to the MCG 402 and may be configured with an SCG transmit power to use when transmitting an uplink transmission to the SCG 406. In some such examples, the summation of the MCG transmit power and the SCG transmit power may be configured to be less than or equal to the maximum transmit power threshold of the UE (e.g., the MCG transmit power+the SCG transmit power is less than or equal to the maximum transmit power of the UE). However, it should be appreciated that in some such examples, the transmit power for uplink transmissions to each cell group may be a static value (e.g., uplink transmissions to the MCG 402 are transmitted at the MCG transmit power and uplink transmissions to the SCG 406 are transmitted at the SCG transmit power) and, thus, may result in examples in which degraded transmit power is employed. For example, the transmit power for uplink transmissions to the MCG 402 may be limited to the MCG transmit power even when there are no scheduled uplink transmissions to the SCG.

In some examples, the semi-static information may include semi-statically configured frame structures configured for each serving cell (PCell and/or SCell) in connection with the UE 404. For example, when a serving cell of the MCG 402 and/or the SCG 406 establishes a connection with the UE 404, the respective serving cell may provide a frame structure including a plurality of symbols and transmission directions associated with each of the symbols. For example, a symbol may be configured for an uplink transmission, a downlink transmission, or a flexible transmission that may be used for an uplink transmission and/or a downlink transmission. Thus, it should be appreciated that the frame structure may include a mix of uplink symbols, downlink symbols, and flexible symbols. It should be appreciated that the transmission direction associated with a symbol indicates whether the direction of transmission that the UE may correspond to a downlink transmission or an uplink transmission (or a flexible transmission) and not to whether an actual transmission is transmitted (during an uplink symbol) or received (during a downlink symbol).

Accordingly, in some examples, the UE 404 may be capable of checking the transmission direction for corresponding symbols associated with different serving cells to determine whether the UE is configured for an overlapping uplink transmission. For example, the UE 404 may be scheduled to transmit an uplink transmission on a symbol N of a TDD frame structure to the MCG 402 and may also be connected to two serving cells 422, 424 of the SCG 406. In some such examples, the UE 404 may check the direction of the corresponding symbol (e.g., symbol N) of the respective TDD frame structures for the two serving cells 422, 424 of the SCG 406 and determine a transmit power for the uplink transmission to the MCG 402 based on the determined directions. For example, when the corresponding symbol (e.g., symbol N) of the respective TDD frame structures for the serving cells 422, 424 indicates a downlink transmission, the UE 404 may determine that the UE 404 is not configured to transmit an uplink transmission to the SCG 406 during that symbol (e.g., symbol N). In some such examples, the UE 404 may determine to transmit the uplink transmission to the MCG 402 using a transmit power up to the maximum transmit power threshold of the UE (e.g., 23 dB).

However, if the transmission direction for at least one of the corresponding symbols (e.g., symbol N) of the respective TDD frame structures for the serving cells 422, 424 indicates an uplink transmission or a flexible transmission, the UE 404 may determine that an uplink transmission to at least one of the serving cells 422, 424 may be possible during the symbol of interest (e.g., symbol N). That is, while the first modem configured to transmit the uplink transmission to the MCG 402 may be unable to determine whether the second modem is actually transmitting an uplink transmission to the SCG 406 based on shared information, the first modem may be able to use the semi-static information corresponding to the transmission directions for the frame structures to determine whether the second modem is capable of transmitting an uplink transmission during the overlapping symbol (e.g., the symbol N). In some such examples when the second modem may be capable of transmitting an uplink transmission to the SCG 406, the UE 404 may determine to transmit the uplink transmission to the MCG 402 using a predetermined transmit power (e.g., the MCG transmit power).

Although the above example describes a scheduled uplink transmission to the MCG 402 and determining the transmission direction of the corresponding symbol(s) of the serving cell(s) of the SCG 406, it should be appreciated that in other examples, the uplink transmission may be scheduled with the MCG 402 and the UE 404 may determine the transmission direction of the corresponding symbol(s) of the serving cell(s) of the MCG 402 (e.g., the serving cells 410, 412) to determine the transmit power for the scheduled uplink transmission to the SCG 406.

Thus, it should be appreciated that when the UE 404 is configured with the semi-static power control mode, in some examples, the UE 404 may determine the transmit power for an uplink transmission to be a static value (e.g., the MCG transmit power). Furthermore, it should be appreciated that in some examples, the UE 404 may determine the transmit power for an uplink transmission based on an uplink capability of the other modem of the UE 404. In either example, when employing semi-static information for determining the transmit power for an uplink transmission, the UE 404 determines the transmit power for an uplink transmission to a first cell group without information regarding whether the UE 404 is actually transmitting an uplink transmission to the other cell group.

As described above, in some examples, the UE 404 may be configured to share information regarding uplink transmissions across cell groups. For example, in some examples, the UE 404 may be configured with a single modem to facilitate dual-connectivity by enabling the UE 404 to connect to the first cell group (e.g., the MCG 402) and to connect to the second cell group (e.g., the SCG 406). In some such examples, information regarding each connection may be shared across the modem. For example, the UE 404 may be able to determine whether the UE 404 is transmitting an uplink transmission to the MCG 402 and/or transmitting an uplink transmission to the SCG 406. It should be appreciated that the shared information may be referred to as "dynamic information" as the information for one connection may be available for determinations regarding the other connection in real-time (or nearly in real-time (e.g., in a timely-manner)). Accordingly, dynamic power sharing techniques may be employed for a UE in which information from a first connection may be shared in a timely-manner for making determinations regarding the other connection. For example, when a UE is configured with dynamic power sharing techniques, the UE 404 may determine the transmit power for an uplink transmission to a cell group based on whether or not the UE 404 is also transmitting another uplink transmission to another cell group.

In some examples, when the UE is configured for dynamic power sharing, the UE may support dynamic power sharing with look-ahead power scaling or may support dynamic power sharing with no look-ahead power scaling. For example, when the UE 404 supports dynamic power sharing, the UE 404 may be configured to implement carrier aggregation techniques. For example, in some examples, the UE 404 may be scheduled to transmit an uplink transmission using two different uplink carriers and the two uplink carriers may not start at the same time. For example, the first uplink carrier may start at symbol 0 and the second uplink carrier may start at symbol 4. In some such examples, it may be possible that the UE 404 starts transmitting via the first uplink carrier (e.g., at symbol 0) and then receives an uplink grant instructing the UE 404 to start transmitting via the second uplink carrier (e.g., at symbol 4).

In some examples in which the UE 404 is not configured to support look-ahead power scaling, the UE 404 may not consider later transmissions when determining the transmit power for a current transmission. For example, the UE 404 may start transmitting the first uplink carrier at a transmit power up to the maximum transmit power without taking into account the second uplink carrier. In some such examples, the UE 404 may adjust (e.g., reduce) the transmit power for the first uplink carrier when the second uplink carrier starts (e.g., at symbol 4) if, for example, the UE 404 determines that the combined transmit power would exceed the maximum transmit power threshold of the UE.

However, when the UE 404 is configured to support look-ahead power scaling, the UE 404 may perform power scaling for uplink transmissions received at least a predetermined time in advance of a start of a symbol. For example, when the UE 404 starts transmitting the first uplink carrier (e.g., at symbol 0), the UE 404 determines a transmit power for the first uplink carrier that takes into account a transmission power for the second uplink carrier that starts at symbol 4. It should be appreciated that the "look-ahead" or the predetermined time in advance of a start of a symbol may be one or more symbols. In some examples, the predetermined time in advance may be less than a subframe. Thus, the UE 404 may perform power scaling to adjust (e.g., reduce) the transmit power of the first uplink carrier based on an indication of a future uplink transmission (e.g., the second uplink carrier at symbol 4).

It should be appreciated that in some examples, when the UE 404 is configured to support look-ahead power scaling, the UE 404 may adjust the transmit power for the different uplink transmissions based on respective priority levels associated with each uplink transmission. For example, different transmissions may be assigned a priority level depending on the channel type (e.g., PUCCH, PUSCH) and/or type of uplink control information it carries. In some such examples, the UE 404 may adjust the transmit powers for the respective uplink transmissions based on the priority level assigned to the transmission. For example, if the first uplink carrier is transmitting data and the second uplink carrier is transmitting ACK/NACK feedback, the UE 404 may prioritize the transmitting of the second uplink carrier by increasing the transmit power for the second uplink carrier and/or determining a transmit power for the first uplink carrier that enables the second uplink carrier to be prioritized.

In some examples, the serving cells of the first cell group (e.g., the serving cells 410, 412 of the MCG 402) may be within a first frequency range (FR1) and the serving cells of the second cell group (e.g., the serving cells 420, 422 of the SCG 406) may also be within the first frequency range (FR1). In some such examples, the UE 404 may be configured to perform power sharing techniques (e.g., semi-static power sharing or dynamic power sharing) for uplink transmissions to either cell group 402, 406.

In some examples, the serving cells of the first cell group (e.g., the serving cells 410, 412 of the MCG 402) may be within a first frequency range (FR1) while the serving cells of the second cell group (e.g., the serving cells 420, 422 of the SCG 406) may be within a second frequency range (FR2). In some such examples, the UE 404 may be configured to perform power sharing techniques (e.g., semi-static power sharing or dynamic power sharing) for uplink transmissions to either cell group 402, 406 so that the combined transmit power at any given time does not exceed the maximum transmit power threshold of the UE. In some aspects, the FR1 band may include a sub-6 gigahertz (GHz) frequency band and the FR2 band may include a millimeter wave (mmW) frequency band.

Figure 5:
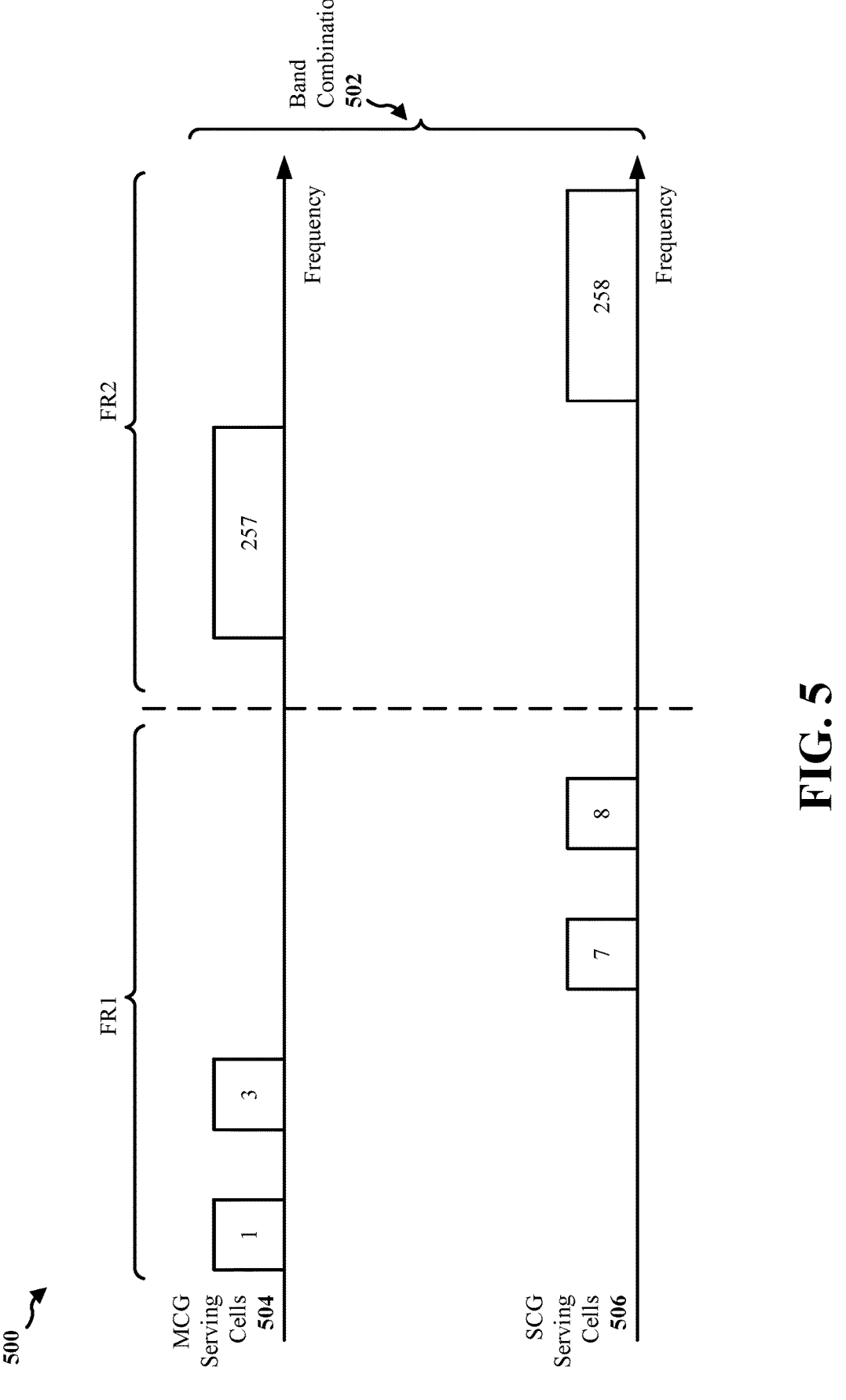
FIG. 5 illustrates a first example scenario including a band combination corresponding to a UE operating in dual connectivity with a first cell group and a second cell group, in accordance with the teachings disclosed herein.
Figure 6:
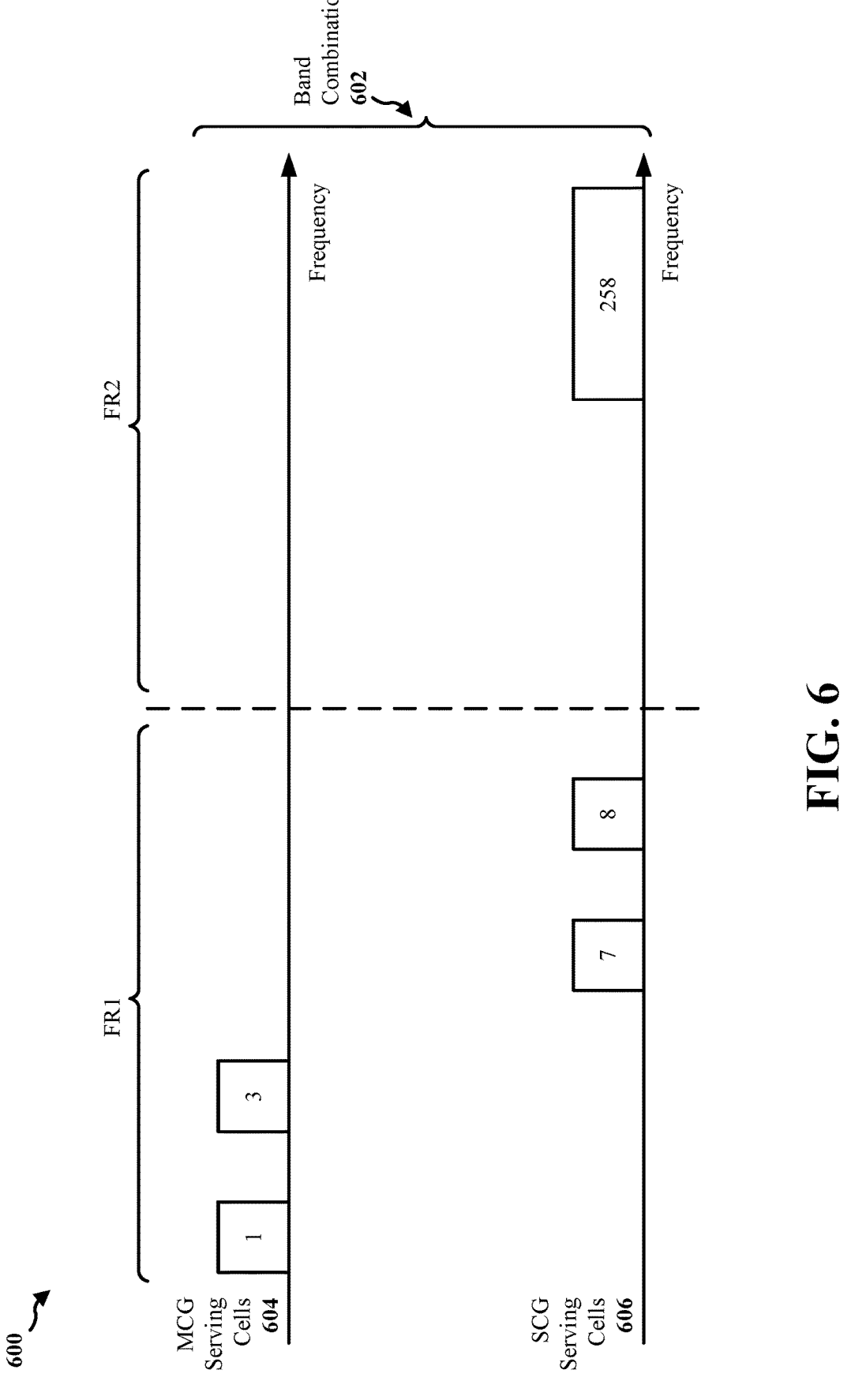
FIG. 6 illustrates a second example scenario including a band combination corresponding to a UE operating in dual connectivity with a first cell group and a second cell group, in accordance with the teachings disclosed herein.
Figure 7:
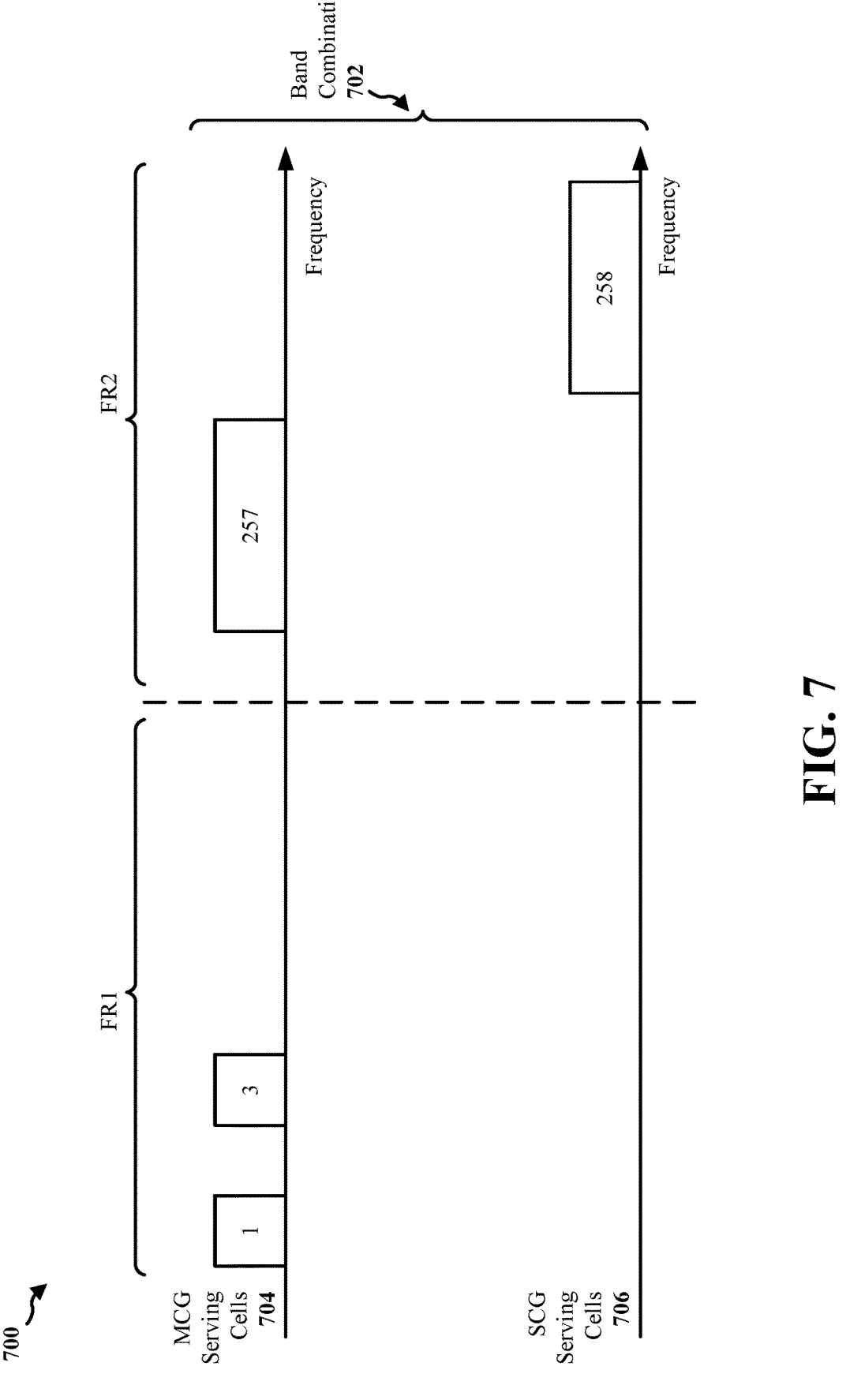
FIG. 7 illustrates a third example scenario including a band combination corresponding to a UE operating in dual connectivity with a first cell group and a second cell group, in accordance with the teachings disclosed herein.

As used herein, the first frequency range (FR1) and the second frequency range (FR2) correspond to different regions of a frequency spectrum. For example, a first frequency range may include 410 MHz to 7126 MHZ, and a second frequency range may include 24.25 GHz to 52.6 GHz. In some examples, a first frequency range may include the sub 6 GHz spectrum, a second frequency range may include the 30 GHz to 300 GHz spectrum, a third frequency range may include the 3 GHz to 30 GHz spectrum, However, in some examples, the serving cells for one or both of the cell groups may be within the first frequency range (FR1) and the second frequency range (FR2). FIGS. 5, 6, and 7 illustrate example band combinations in which serving cells for one or both of the cell groups may be within the first frequency range (FR1) and the second frequency range (FR2).

FIG. 5 illustrates a first example scenario 500 including a band combination 502 corresponding to a UE operating in dual connectivity with a first cell group (e.g., an MCG 504) and a second cell group (e.g., an SCG 506). In the illustrated example of FIG. 5, the band combination 502 includes band 1, band 3, band 7, band 8, band 257, and band 258, and each band corresponds to a serving cell. Thus, as shown in FIG. 5, the UE is connected to the MCG 504 via MCG serving cells corresponding to band 1, band 3, and band 257. The UE is also connected to the SCG 506 via SCG serving cells corresponding to band 7, band 8, and band 258.

In the illustrated example of FIG. 5, the MCG serving cells include a first set of serving cells within a first frequency range (FR1) (e.g., the serving cells corresponding to band 1 and band 3) and a second set of serving cells within a second frequency range (FR2) (e.g., the serving cell corresponding to band 257). Similarly, the SCG serving cells include a first set of serving cells within the first frequency range (FR1) (e.g., the serving cells corresponding to band 7 and band 8) and a second set of serving cells within the second frequency range (FR2) (e.g., the serving cell corresponding to band 258).

FIG. 6 illustrates a second example scenario 600 including a band combination 602 corresponding to a UE operating in dual connectivity with a first cell group (e.g., an MCG 604) and a second cell group (e.g., an SCG 606). In the illustrated example of FIG. 6, the band combination 602 includes band 1, band 3, band 7, band 8, and band 258, and each band corresponds to a serving cell. Thus, as shown in FIG. 6, the UE is connected to the MCG 604 via MCG serving cells corresponding to band 1 and band 3. The UE is also connected to the SCG 606 via SCG serving cells corresponding to band 7, band 8, and band 258.

In the illustrated example of FIG. 6, the MCG serving cells include a first set of serving cells within a first frequency range (FR1) (e.g., the serving cells corresponding to band 1 and band 3). Similarly, the SCG serving cells include a first set of serving cells within the first frequency range (FR1) (e.g., the serving cells corresponding to band 7 and band 8) and a second set of serving cells within the second frequency range (FR2) (e.g., the serving cell corresponding to band 258).

Although the illustrated example of FIG. 6 depicts the first set of serving cells of the MCG 604 within the first frequency range (FR1), it should be appreciated that in other examples, the first set of serving cells of the MCG 604 may be within the second frequency range (FR2).

FIG. 7 illustrates a third example scenario 700 including a band combination 702 corresponding to a UE operating in dual connectivity with a first cell group (e.g., an MCG 704) and a second cell group (e.g., an SCG 706). In the illustrated example of FIG. 7, the band combination 702 includes band 1, band 3, band 257, and band 258, and each band corresponds to a serving cell. Thus, as shown in FIG. 7, the UE is connected to the MCG 704 via MCG serving cells corresponding to band 1, band 3, and band 257. The UE is also connected to the SCG 706 via an SCG serving cell corresponding to the band 258.

In the illustrated example of FIG. 7, the MCG serving cells include a first set of serving cells within a first frequency range (FR1) (e.g., the serving cells corresponding to band 1 and band 3) and a second set of serving cells within a second frequency range (FR2) (e.g., the serving cell corresponding to band 257). Similarly, the SCG serving cells include a first set of serving cells within the second frequency range (FR2) (e.g., the serving cell corresponding to band 258).

Although the illustrated example of FIG. 7 depicts the first set of serving cells of the SCG 706 within the second frequency range (FR2), it should be appreciated that in other examples, the first set of serving cells of the SCG 706 may be within the first frequency range (FR1).

Based on the illustrated example scenarios of FIGS. 5, 6, and 7, it should be appreciated that in some examples, the MCG carriers and the SCG carriers may overlap for at least one of the frequency ranges (e.g., in the second example scenario 600 of FIG. 6 and in the third example scenario 700 of FIG. 7) or may overlap for both frequency ranges (e.g., in the first example scenario 500 of FIG. 5).

For example, based on the illustrated first example scenario 500 of FIG. 5, when the UE is transmitting an uplink transmission to the MCG 504 and/or the SCG 506, the UE may be using carriers in the first frequency range (FR1) and the second frequency range (FR2). Additionally, based on the illustrated second example scenario 600 of FIG. 6, when the UE is transmitting an uplink transmission to the MCG 604 and/or the SCG 606, there may be an overlap in carriers within the first frequency range (FR1) and no overlap in carriers within the second frequency range (FR2). Furthermore, based on the illustrated third example scenario 700 of FIG. 7, when the UE is transmitting an uplink transmission to the MCG 704 and/or the SCG 706, there may be an overlap in carriers within the second frequency range (FR2) and no overlap in carriers within the first frequency range (FR1).

Example techniques disclosed herein enable the UE to be configured with power control modes for each frequency range within which the UE may be connected. For example, when the MCG serving cells and the SCG serving cells overlap within a first frequency range (FR1) and also overlap within a second frequency range (FR2) (as shown in the first example scenario 500 of FIG. 5), the UE may be configured with a first power control mode for the first frequency range (FR1) and may be configured with a second power control mode for the second frequency range (FR2). In some such examples, the first power control mode may correspond to semi-static power sharing techniques and/or to dynamic power sharing techniques. Similarly, the second power control mode may correspond to semi-static power sharing techniques and/or to dynamic power sharing techniques.

In some examples in which the MCG serving cells and the SCG serving cells overlap within one of the frequency ranges and do not overlap within the other frequency range (e.g., as shown in the second example scenario 600 of FIG. 6 and the third example scenario 700 of FIG. 7), the UE may be configured with a first power control mode for the frequency range including the overlapping serving cells and may be configured with a second power control mode for the other frequency range. In some such examples, the first power control mode may correspond to semi-static power sharing techniques and/or to dynamic power sharing techniques. In some examples, the second power control mode may not correspond to a power sharing technique. That is, the second power control mode may enable the UE to operate at a transmit power up to the maximum transmit power threshold of the UE for serving cells within the non-overlapped frequency range (e.g., the second frequency range (FR2) in the second example scenario 600 of FIG. 6 or the first frequency range (FR1) in the third example scenario 700 of FIG. 7).

Figure 8:
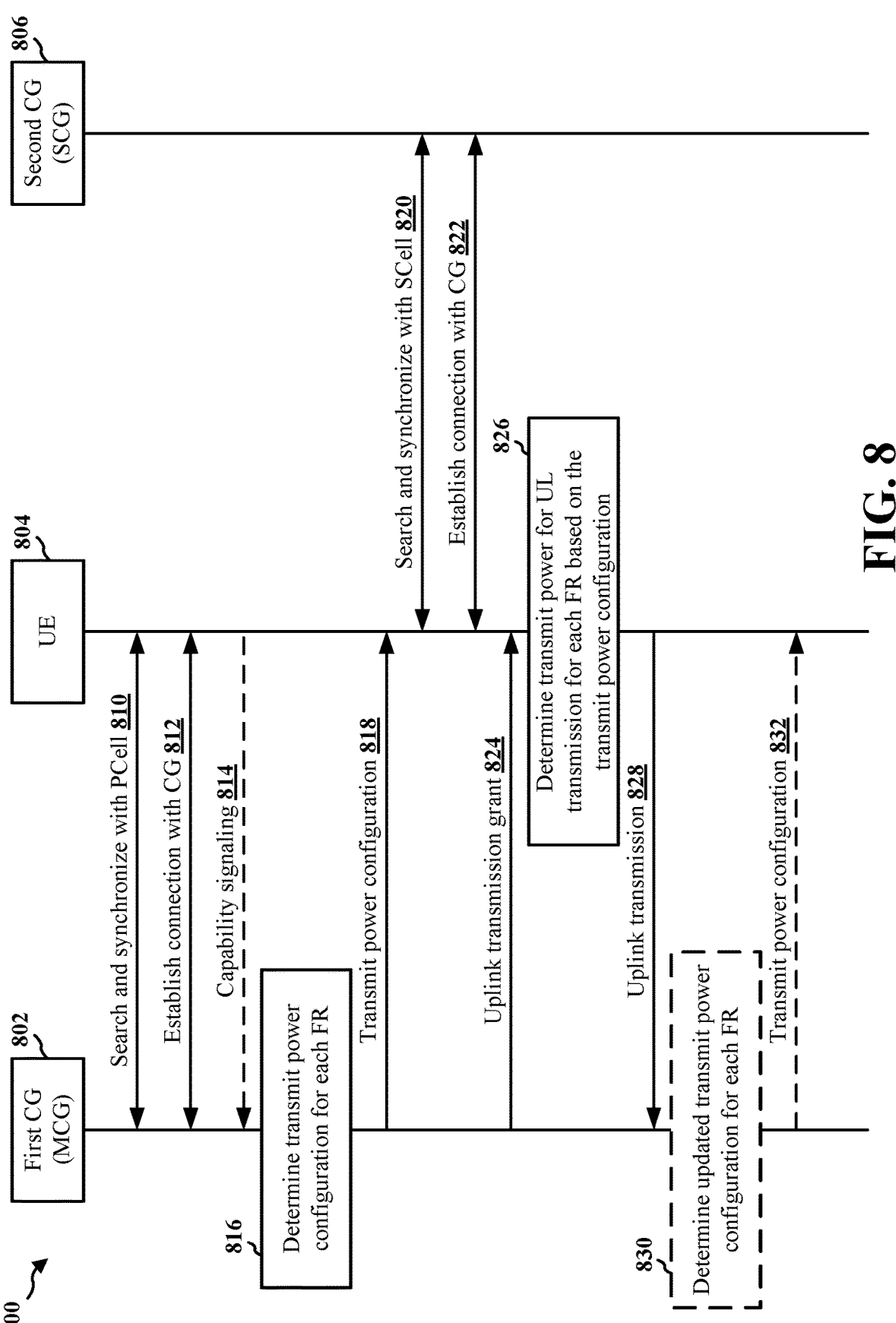
FIG. 8 is an example communication flow between a UE, a first cell group and a second cell group, in accordance with the teachings disclosed herein.

FIG. 8 illustrates an example wireless communication 800 between a first cell group 802, a UE 804, and a second cell group 806, as presented herein. One or more aspects of the cell groups 802, 806 may be implemented by the base station 180 of FIG. 1, the base station 310 of FIG. 3, and/or the cell groups 402, 404 of FIG. 4. One or more aspects of the UE 804 may be implemented by the UE 104 of FIG. 1, the UE 350 of FIG. 3, and/or the UE 404 of FIG. 4.

In the illustrated example of FIG. 8, the UE A04 is configured to support dual connectivity. Furthermore, the first cell group 802 and the second cell group 806 may support NR communication technologies. Accordingly, the UE 804 may be configured to support NR-NR dual connectivity (sometimes referred to as "NR-DC," NR-NR DC," or "NN-DC").

In the illustrated example of FIG. 8, the UE 804 searches for and synchronizes with, at 810, a primary cell (PCell) of the first cell group 802. In some examples, the UE 804 may perform the searching for and synchronizing with the PCell of the first cell group 802 after powering-on.

The UE 804 may then establish a connection, at 812, with the first cell group 802 via the primary cell of the first cell group 802. In some examples, the connection may be established according to connection establishment techniques in which the UE 804 may request a connection (e.g., via a random access request) with the first cell group 802.

In some examples, the UE 804 may also transmit capability signaling 814 during the connection establishment techniques. In some examples, the capability signaling 814 includes a power sharing capability report of the UE 804 for each frequency range supported by the UE 804 when operating in dual connectivity. In some examples, the power sharing capability report indicates whether the UE 804 supports semi-static power sharing and/or a dynamic power sharing. In some examples, the UE 804 may transmit the capability signaling 814 via radio resource control (RRC) signaling.

The first cell group 802 (e.g., the PCell of the first cell group 802) may then determine, at 816, a transmit power configuration for the UE 804 for each frequency range. For example, the first cell group 802 may determine a first power control mode for the first frequency range (FR1) and a second power control mode for the second frequency range (FR2). In some examples, the first cell group 802 may determine the transmit power configuration based on the capability signaling 814 received from the UE 804. For example, the first cell group 802 may determine the first power control mode for the first frequency range (FR1) based on which semi-static power sharing capabilities and/or dynamic power sharing capabilities the UE 804 reported via the capability signaling 814 that the UE 804 supported (or did not support) for the first frequency range (FR1). The first cell group 802 may also determine the second power control mode for the second frequency range (FR2) based on which semi-static power sharing capabilities and/or dynamic power sharing capabilities the UE 804 reported via the capability signaling 814 that the UE 804 supported (or did not support) for the second frequency range (FR2).

The first cell group 802 (e.g., the PCell of the first cell group 802) may then transmit a transmit power configuration 818 to the UE 804. In some examples, the transmit power configuration 818 may include the first power control mode and the second power control mode. In some examples, the first cell group 802 may transmit the transmit power configuration 818 to the UE 804 via RRC signaling. In some examples, the transmit power configuration 818 may include the semi-static information used by the UE 804 when the UE supports semi-static power sharing. For example, the transmit power configuration 818 may include the MCG transmit power and the SCG transmit power when the UE 804 is configured to determine the transmit power based on the static capability supported by the UE 804. In some examples, the transmit power configuration 818 may include the MCG transmit power and the SCG transmit power when the UE 804 is configured to determine transmit power based on the semi-dynamic capability supported by the 804.

After receiving the transmit power configuration 818 from the first cell group 802, the UE may then establish dual connectivity with a second cell group. For example, the UE 804 may search for and synchronize with, at 820, a primary cell (PCell) of the second cell group 806.

The UE 804 may then establish a connection, at 822, with the second cell group 806 via the primary cell of the second cell group 806. In some examples, the connection may be established according to connection establishment techniques in which the UE 804 may request a connection (e.g., via a random access request) with the second cell group 806. In some examples, after the UE 804 establishes the connection with the second cell group 806, the first cell group 802 may be referred to as the master cell group and the second cell group 806 may be referred to as the secondary cell group.

In some examples, after the UE 804 establishes dual connectivity (e.g., with the one or more serving cells of the MCG 802 and the one or more serving cells of the SCG 806), the UE 804 may receive an uplink transmission grant. For example, the UE 804 may receive an uplink transmission grant 824 from the MCG 802. It should be appreciated that the uplink transmission grant 824 may schedule uplink resources for one or more uplink transmissions. In some examples, the MCG 802 may provide the uplink transmission grant 824 via downlink control information (DCI) that is transmitted to the UE 804.

The UE 804 may then determine, at 826, a transmit power for an uplink transmission to the MCG 802. In some examples, the UE 804 may determine the transmit power for each frequency range based on the transmit power configuration 818 received from the MCG 802. For example, the UE 804 may be configured to apply (based on the transmit power configuration 818) the static capability, the semi-dynamic capability, the dynamic without look-ahead capability, or the dynamic with look-ahead capability to determine the transmit power for the uplink transmission to the MCG 802.

The UE 804 may then transmit an uplink transmission 828 to the MCG 802 using the determined transmit power.

In some examples, the MCG 802 may determine that capabilities and/or conditions have changed that may result in different transmit power configurations that may apply to the UE 804. For example, a change in channel qualities across different frequencies may cause the MCG 802 to determine, at 830, an updated transmit power configuration for the UE 804. The MCG 802 may then transmit the updated transmit power configuration 832 to the UE 804. In some examples, the MCG 802 may transmit the updated transmit power configuration 832 to the UE 804 via RRC signaling.

In some examples, the capability signaling 814 may report whether the UE supports semi-static power sharing for each frequency range (e.g., the FR1 and the FR2). In some such examples, the UE may also report a semi-static power sharing capability based on the type of semi-static information available to the UE. For example, the UE may report whether the UE is capable of checking transmission directions for corresponding symbols based on semi-static frame structures provided for different serving cells in communication with the UE (sometimes referred to herein as a "semi-dynamic capability" as the UE may utilize semi-static information to determine a transmit power that may be up to a maximum transmit power threshold of the UE). Additionally or alternatively, the UE may report whether the UE is capable of determining the transmit power for an uplink transmission based on static values provided to the UE (sometimes referred to herein as a "static capability" as the UE may utilize semi-static information to determine a static transmit power for an uplink transmission (e.g., the MCG transmit power or the SCG transmit power).

In some examples, the capability signaling 814 may report whether the UE supports dynamic power sharing for each frequency range (e.g., the FR1 and the FR2). In some such examples, the UE may also report a dynamic power sharing capability. For example, the UE may report whether the UE supports dynamic power sharing with look-ahead power scaling (sometimes referred to herein as a "dynamic with look-ahead capability" as the UE may utilize dynamic (or shared) information regarding a future uplink transmission to determine a transmit power for a current uplink transmission). Additionally or alternatively, the UE may report whether the UE supports dynamic power sharing without look-ahead power scaling (sometimes referred to herein as a "dynamic without look-ahead capability" as the UE may utilize dynamic (or shared) information to determine a transmit power for a current uplink transmission).

In some examples, the capability signaling 814 may report the power sharing capabilities of the UE per frequency range. For example, the power sharing capability report may include the one or more band combinations supported by the UE. The power sharing capability report may also include, for each frequency range that the UE supports, whether the UE supports semi-static power sharing and, if so, which semi-static power sharing capabilities (e.g., the semi-dynamic capability and/or the static capability) the UE supports or does not support. For example, the power sharing capability report may include each of the one or more band combinations supported by the UE, whether the UE supports semi-static power sharing for the first frequency range (FR1) (and, if so, whether the UE supports the semi-dynamic capability and/or the static capability for the first frequency range), and whether the UE supports semi-static power sharing for the second frequency range (FR2) (and, if so, whether the UE supports the semi-dynamic capability and/or the static capability for the second frequency range).

In some examples, the power sharing capability report may additionally or alternatively include, for each frequency range that the UE supports, whether the UE supports dynamic power sharing and, if so, which dynamic power sharing capabilities (e.g., the dynamic with look-ahead capability and/or the dynamic without look-ahead capability) the UE supports or does not support. For example, the power sharing capability report may include each of the one or more band combinations supported by the UE, whether the UE supports dynamic power sharing for the first frequency range (FR1) (and, if so, whether the UE supports the dynamic with look-ahead capability and/or the dynamic without look-ahead capability for the first frequency range), and whether the UE supports dynamic power sharing for the second frequency range (FR2) (and, if so, whether the UE supports the dynamic with look-ahead capability and/or the dynamic without look-ahead capability for the second frequency range).

Thus, it should be appreciated that in some examples, the UE may support only semi-static power sharing, may support only dynamic power sharing, and/or may support a combination of semi-static power sharing and dynamic power sharing. For example, the UE may support semi-static power sharing for the first frequency range (FR1) and may support dynamic power sharing for the second frequency range (FR2). Additionally or alternatively, the UE may support both semi-static power sharing and dynamic power sharing for the first frequency range (FR1) and/or the second frequency range (FR2).

In some examples, the power sharing capability report may include information per band combination for each frequency range. For example, the UE may support three band combinations (e.g., the band combinations 502, 602, 702 of FIGS. 5, 6, and 7) across the first frequency range (FR1) and the second frequency range (FR2). In some such examples, the power sharing capability report may include the bands of the first band combination (e.g., the band combination 502 including band 1, band 3, band 7, band 8, band 257, and band 258), which power sharing capabilities the UE 804 supports (or does not support) for the first frequency range (FR1) for the first band combination, and which power sharing capabilities the UE 804 supports (or does not support) for the second frequency range (FR2) for the first band combination. The power sharing capability report may also include the bands of the second band combination (e.g., the band combination 602 including band 1, band 3, band 7, band 8, and band 258), which power sharing capabilities the UE 804 supports (or does not support) for the first frequency range (FR1) for the second band combination, and which power sharing capabilities the UE 804 supports (or does not support) for the second frequency range (FR2) for the second band combination. The power sharing capability report may also include the bands of the third band combination (e.g., the band combination 702 including band 1, band 3, band 257, and band 258), which power sharing capabilities the UE 804 supports (or does not support) for the first frequency range (FR1) for the third band combination, and which power sharing capabilities the UE 804 supports (or does not support) for the second frequency range (FR2) for the third band combination.

It should be appreciated that in some examples, the UE may indicate which of the semi-static power sharing capabilities (e.g., the static capability and/or the semi-dynamic capability) and/or the dynamic power sharing capabilities (e.g., the dynamic without look-ahead capability and/or the dynamic with look-ahead capability) that the UE supports and the cell group may determine whether the UE supports semi-static power sharing and/or dynamic power sharing accordingly. For example, in some examples, the power sharing capability report may include whether the UE supports semi-static power sharing and which of the semi-static power sharing capabilities the UE supports (or does not support) for each frequency range, and in some other examples, the power sharing capability report may include which of the semi-static power sharing capabilities the UE supports (or does not support) for each frequency range (e.g., does not include whether the UE supports semi-static power sharing).

It should be appreciated that in some examples, the UE 804 may additionally or alternatively transmit capability signaling to the SCG 806.

In some examples, the SCG 806 may determine a transmit power configuration for the UE 804 and may transmit the determined transmit power configuration to the UE 804. In some such examples, the SCG 806 may transmit the determined transmit power configuration to the UE 804 via RRC signaling.

FIG. 9 is a flowchart of a method 900 of wireless communication. The method 900 may be performed by a UE (e.g., the UE 104, the UE 350, the UE 404, the UE 804, the apparatus 1202/1202, the processing system 1314, which may include the memory 360 and which may be the entire UE 350 or a component of the UE 350, such as the TX processor 368, the RX processor 356, and/or the controller/processor 359). Optional aspects are illustrated with a dashed line. In the illustrated example of FIG. 9, the method 900 may correspond to the first example scenario 500 of FIG. 5.

At 902, the UE connects to an MCG on a first set of MCG serving cells within an FR1 and a second set of MCG serving cells within an FR2, as described in connection with, for example, the connection 812 of FIG. 8. For example, the first cell group connection handling component 1210 may facilitate the connecting of the UE to the MCG on the first set of MCG serving cells within the FR1 and the second set of MCG serving cells within the FR2.

At 904, the UE connects to an SCG on a first set of SCG serving cells within the FR1 and a second set of SCG serving cells within the FR2, as described in connection with, for example, the connection 822 of FIG. 8. For example, the second cell group connection handling component 1212 may facilitate the connecting of the UE to the SCG on the first set of SCG serving cells within the FR1 and the second set of SCG serving cells within the FR2.

At 906, the UE may transmit a first capability for indicating support of a first transmit power control method or a second transmit power control method for the FR1, as described in connection with the capabilities signaling 814 of FIG. 8. For example, the capabilities reporting component 1214 may facilitate the transmitting of the first capability for the FR1. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the first capability may be per UE. In some examples, the transmitting of the first capability may be per band combination.

At 908, the UE may transmit a second capability for indicating support of the first transmit power control method or the second transmit power control method for the FR2, as described in connection with the capabilities signaling 814 of FIG. 8. For example, the capabilities reporting component 1214 may facilitate the transmitting of the second capability for the FR2. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the second capability may be per UE. In some examples, the transmitting of the second capability may be per band combination.

At 910, the UE may receive a transmit power configuration for a power control mode for both FR1 and for FR2, as described in connection with the transmit power configuration 818 of FIG. 8. For example, the transmit power configuration receiving component 1216 may facilitate the receiving of the transmit power configuration for the power control mode for both FR1 and for FR2. In some examples, the transmit power configuration may include a first power control mode for the FR1 and may include a second power control mode for the FR2.

At 912, the UE may transmit to at least one of the MCG serving cells or the SCG serving cells with a transmit power determined based on the transmit power configuration, as described in connection with the determining of the transmit power, at 826, and the uplink transmission 828 of FIG. 8. For example, the transmit power determination component 1218 may facilitate the transmitting to the at least one of the MCG serving cells or the SCG serving cells with the transmit power determined based on the transmit power configuration.

In some examples, the transmitting to the at least one of the MCG serving cells or the SCG serving cells may include transmitting on one or both of the frequency ranges. For example, at 914, the UE may transmit on FR1 to the at least one of the MCG serving cells or the SCG serving cells with a first transmit power determined based on a power control mode for FR1, as described in connection with the determining of the transmit power, at 826, and the uplink transmission 828 of FIG. 8. For example, the transmit power determination component 1218 may facilitate the transmitting on FR1 to the at least one of the MCG serving cells or the SCG serving cells with the first transmit power determined based on the power control mode for FR1.

At 916, the UE may transmit on FR2 to the at least one of the MCG serving cells or the SCG serving cells with a second transmit power determined based on a power control mode for FR2, as described in connection with the determining of the transmit power, at 826, and the uplink transmission 828 of FIG. 8. For example, the transmit power determination component 1218 may facilitate the transmitting on FR2 to the at least one of the MCG serving cells or the SCG serving cells with the second transmit power determined based on the power control mode for FR2.

Figure 10:
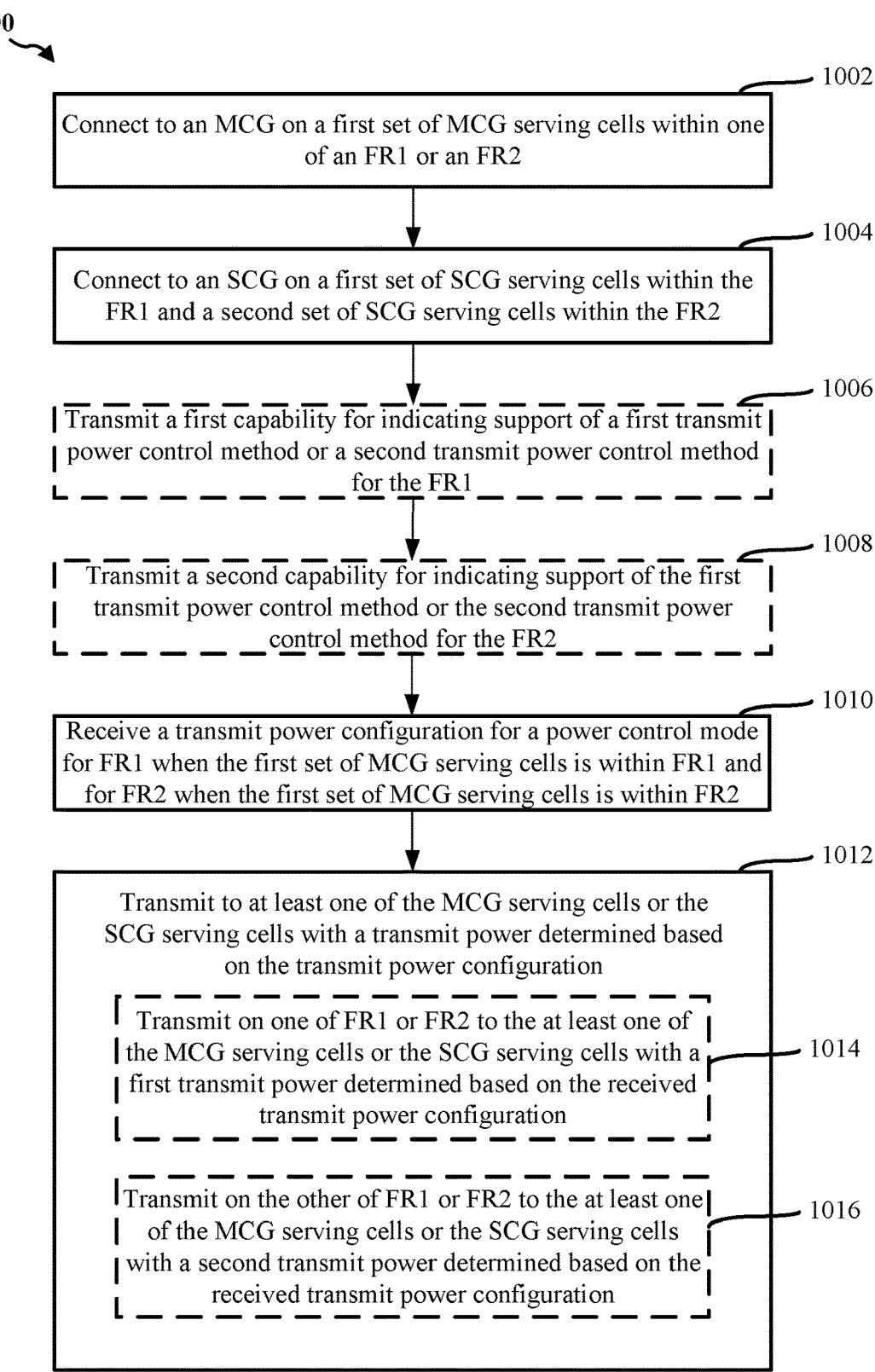

FIG. 10 is a flowchart of a method 1000 of wireless communication. The method 1000 may be performed by a UE (e.g., the UE 104, the UE 350, the UE 404, the UE 804, the apparatus 1202/1202, the processing system 1314, which may include the memory 360 and which may be the entire UE 350 or a component of the UE 350, such as the TX processor 368, the RX processor 356, and/or the controller/processor 359). Optional aspects are illustrated with a dashed line. In the illustrated example of FIG. 10, the method 1000 may correspond to the second example scenario 600 of FIG. 6.

At 1002, the UE connects to an MCG on a first set of MCG serving cells within one of an FR1 or an FR2, as described in connection with, for example, the connection 812 of FIG. 8. For example, the first cell group connection handling component 1210 may facilitate the connecting of the UE to the MCG on the first set of MCG serving cells within one of the FR1 or the FR2.

At 1004, the UE connects to an SCG on a first set of SCG serving cells within the FR1 and a second set of SCG serving cells within the FR2, as described in connection with, for example, the connection 822 of FIG. 8. For example, the second cell group connection handling component 1212 may facilitate the connecting of the UE to the SCG on the first set of SCG serving cells within the FR1 and the second set of SCG serving cells within the FR2.

At 1006, the UE may transmit a first capability for indicating support of a first transmit power control method or a second transmit power control method for the FR1, as described in connection with the capabilities signaling 814 of FIG. 8. For example, the capabilities reporting component 1214 may facilitate the transmitting of the first capability for the FR1. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the first capability may be per UE. In some examples, the transmitting of the first capability may be per band combination.

At 1008, the UE may transmit a second capability for indicating support of the first transmit power control method or the second transmit power control method for the FR2, as described in connection with the capabilities signaling 814 of FIG. 8. For example, the capabilities reporting component 1214 may facilitate the transmitting of the second capability for the FR2. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the second capability may be per UE. In some examples, the transmitting of the second capability may be per band combination.

At 1010, the UE may receive a transmit power configuration for a power control mode for FR1 when the first set of MCG serving cells is within FR1 and for FR2 when the first set of MCG serving cells is within FR2, as described in connection with the transmit power configuration 818 of FIG. 8. For example, the transmit power configuration receiving component 1216 may facilitate the receiving of the transmit power configuration for the power control mode for FR1 when the first set of MCG serving cells is within FR1 and for FR2 when the first set of MCG serving cells is within FR2. In some examples, the transmit power configuration may include a first power control mode for the FR1 and may include a second power control mode for the FR2.

At 1012, the UE may transmit to at least one of the MCG serving cells or the SCG serving cells with a transmit power determined based on the transmit power configuration, as described in connection with the determining of the transmit power, at 826, and the uplink transmission 828 of FIG. 8. For example, the transmit power determination component 1218 may facilitate the transmitting to the at least one of the MCG serving cells or the SCG serving cells with the transmit power determined based on the transmit power configuration.

In some examples, the transmitting to the at least one of the MCG serving cells or the SCG serving cells may include transmitting on one or both of the frequency ranges. For example, at 1014, the UE may transmit on one of FR1 or FR2 to the at least one of the MCG serving cells or the SCG serving cells with a first transmit power determined based on the received transmit power configuration, as described in connection with the determining of the transmit power, at 826, and the uplink transmission 828 of FIG. 8. For example, the transmit power determination component 1218 may facilitate the transmitting on FR1 to the at least one of the MCG serving cells or the SCG serving cells with the first transmit power determined based on the received transmit power configuration.

At 1016, the UE may transmit on the other of the FR1 or the FR2 to the at least one of the MCG serving cells or the SCG serving cells with a second transmit power determined based on the received transmit power configuration, as described in connection with the determining of the transmit power, at 826, and the uplink transmission 828 of FIG. 8. For example, the transmit power determination component 1218 may facilitate the transmitting on FR2 to the at least one of the MCG serving cells or the SCG serving cells with the second transmit power determined based on the received transmit power configuration.

FIG. 11 is a flowchart of a method 1100 of wireless communication. The method 1100 may be performed by a UE (e.g., the UE 104, the UE 350, the UE 404, the UE 804, the apparatus 1202/1202, the processing system 1314, which may include the memory 360 and which may be the entire UE 350 or a component of the UE 350, such as the TX processor 368, the RX processor 356, and/or the controller/processor 359). Optional aspects are illustrated with a dashed line. In the illustrated example of FIG. 11, the method 1100 may correspond to the third example scenario 700 of FIG. 7.

At 1102, the UE connects to an SCG on a first set of SCG serving cells within one of an FR1 or an FR2, as described in connection with, for example, the connection 822 of FIG. 8. For example, the second cell group connection handling component 1212 may facilitate the connecting of the UE to the SCG on the first set of SCG serving cells within one of the FR1 or the FR2.

At 1104, the UE connects to an MCG on a first set of MCG serving cells within the FR1 and a second set of MCG serving cells within the FR2, as described in connection with, for example, the connection 812 of FIG. 8. For example, the first cell group connection handling component 1210 may facilitate the connecting of the UE to the MCG on the first set of MCG serving cells within the FR1 and the second set of MCG serving cells within the FR2.

At 1106, the UE may transmit a first capability for indicating support of a first transmit power control method or a second transmit power control method for the FR1, as described in connection with the capabilities signaling 814 of FIG. 8. For example, the capabilities reporting component 1214 may facilitate the transmitting of the first capability for the FR1. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the first capability may be per UE. In some examples, the transmitting of the first capability may be per band combination.

At 1108, the UE may transmit a second capability for indicating support of the first transmit power control method or the second transmit power control method for the FR2, as described in connection with the capabilities signaling 814 of FIG. 8. For example, the capabilities reporting component 1214 may facilitate the transmitting of the second capability for the FR2. In some examples, the first transmit power control method may include the static capability and the second transmit power control method may include the semi-dynamic capability. In some examples, the first transmit power control method may include the dynamic without look-ahead capability and the second transmit power control method may include the dynamic with look-ahead capability. However, it should be appreciated that the first transmit power control method and the second transmit power control method may include additional or alternative combinations of the semi-static power sharing capabilities and the dynamic power sharing capabilities. In some examples, the transmitting of the second capability may be per UE. In some examples, the transmitting of the second capability may be per band combination.

At 1110, the UE may receive a transmit power configuration for a power control mode for FR1 when the first set of SCG serving cells is within FR1 and for FR2 when the first set of SCG serving cells is within FR2, as described in connection with the transmit power configuration 818 of FIG. 8. For example, the transmit power configuration receiving component 1216 may facilitate the receiving of the transmit power configuration for the power control mode for FR1 when the first set of SCG serving cells is within FR1 and for FR2 when the first set of SCG serving cells is within FR2. In some examples, the transmit power configuration may include a first power control mode for the FR1 and may include a second power control mode for the FR2.

At 1112, the UE may transmit to at least one of the MCG serving cells or the SCG serving cells with a transmit power determined based on the transmit power configuration, as described in connection with the determining of the transmit power, at 826, and the uplink transmission 828 of FIG. 8. For example, the transmit power determination component 1218 may facilitate the transmitting to the at least one of the MCG serving cells or the SCG serving cells with the transmit power determined based on the transmit power configuration.

In some examples, the transmitting to the at least one of the MCG serving cells or the SCG serving cells may include transmitting on one or both of the frequency ranges. For example, at 1114, the UE may transmit on one of FR1 or FR2 to the at least one of the MCG serving cells or the SCG serving cells with a first transmit power determined based on the received transmit power configuration, as described in connection with the determining of the transmit power, at 826, and the uplink transmission 828 of FIG. 8. For example, the transmit power determination component 1218 may facilitate the transmitting on FR1 to the at least one of the MCG serving cells or the SCG serving cells with the first transmit power determined based on the received transmit power configuration.

At 1116, the UE may transmit on the other of the FR1 or the FR2 to the at least one of the MCG serving cells or the SCG serving cells with a second transmit power determined based on the received transmit power configuration, as described in connection with the determining of the transmit power, at 826, and the uplink transmission 828 of FIG. 8. For example, the transmit power determination component 1218 may facilitate the transmitting on FR2 to the at least one of the MCG serving cells or the SCG serving cells with the second transmit power determined based on the received transmit power configuration.

Figure 12:
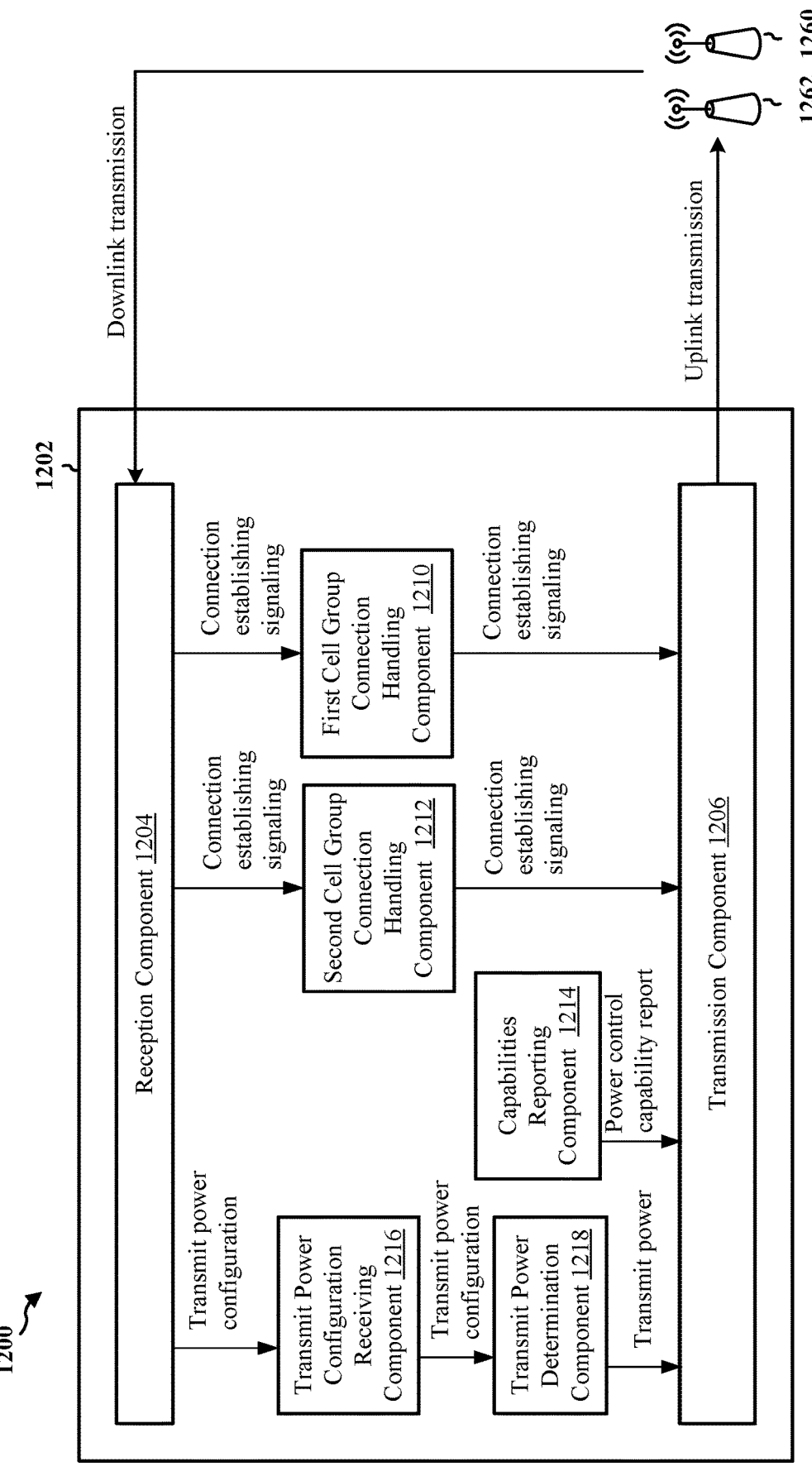
FIG. 12 is a conception data flow diagram illustrating the data flow between different means/components in an example apparatus.

FIG. 12 is a conceptual data flow diagram 1200 illustrating the data flow between different means/components in an example apparatus 1202 in communication with a first cell group 1260 and a second cell group 1262. The apparatus may be UE. The apparatus includes a reception component 1204, a transmission component 1206, a first cell group connection handling component 1210, a second cell group connection handling component 1212, a capabilities reporting component 1214, a transmit power configuration receiving component 1216, and a transmit power determination component 1218.

The reception component 1204 may be configured to receive various types of signals/messages and/or other information from other devices, including, for example, the first cell group 1260 and/or the second cell group 1262. The messages/information may be received via the reception component 1204 and provided to one or more components of the apparatus 1202 for further processing and use in performing various operations. For example, the reception component 1204 may be configured to receive signaling including, for example, indications, reference signal(s), and/or schedules (e.g., as described in connection with 902, 904, 910, 1002, 1004, 1010, 1102, 1104, and/or 1110).

The transmission component 1206 may be configured to transmit various types of signals/messages and/or other information to other devices, including, for example, the first cell group 1260 and/or the second cell group 1262. For example, the transmission component 1206 may be configured to transmit uplink communications, such as power control capability reports and/or uplink transmissions (e.g., as described in connection with 906, 908, 912, 914, 916, 1006, 1008, 1012, 1014, 1016, 1106, 1108, 1112, 1114, and/or 1116,).

The first cell group connection handling component 1210 may be configured to establish a connection with a first cell group (e.g., as described in connection with 902, 1002, and/or 1104).

The second cell group connection handling component 1212 may be configured to establish a connection with a second cell group (e.g., as described in connection with 904, 1004, and/or 1102).

The capabilities reporting component 1214 may be configured to report capabilities for indicating support for a first transmit power control method or a second transmit power control for the FR1 and/or the FR2 (e.g., as described in connection with 906, 908, 1006, 1008, 1106, and/or 1108).

The transmit power configuration receiving component 1216 may be configured to receive a transmit power configuration for a power control mode for the FR1 and/or the FR2 (e.g., as described in connection with 910, 1010, and/or 1110).

The transmit power determination component 1218 may be configured to determine a transmit power for an uplink transmission on one or both of FR1 and FR2 based on the received transmit power configuration (e.g., as described in connection 912, 914, 916, 1012, 1014, 1016, 1112, 1114, and/or 1116).

The apparatus may include additional components that perform each of the blocks of the algorithm in the aforementioned flowcharts of FIGS. 9, 10, and/or 11. As such, each block in the aforementioned flowcharts of FIGS. 9, 10, and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
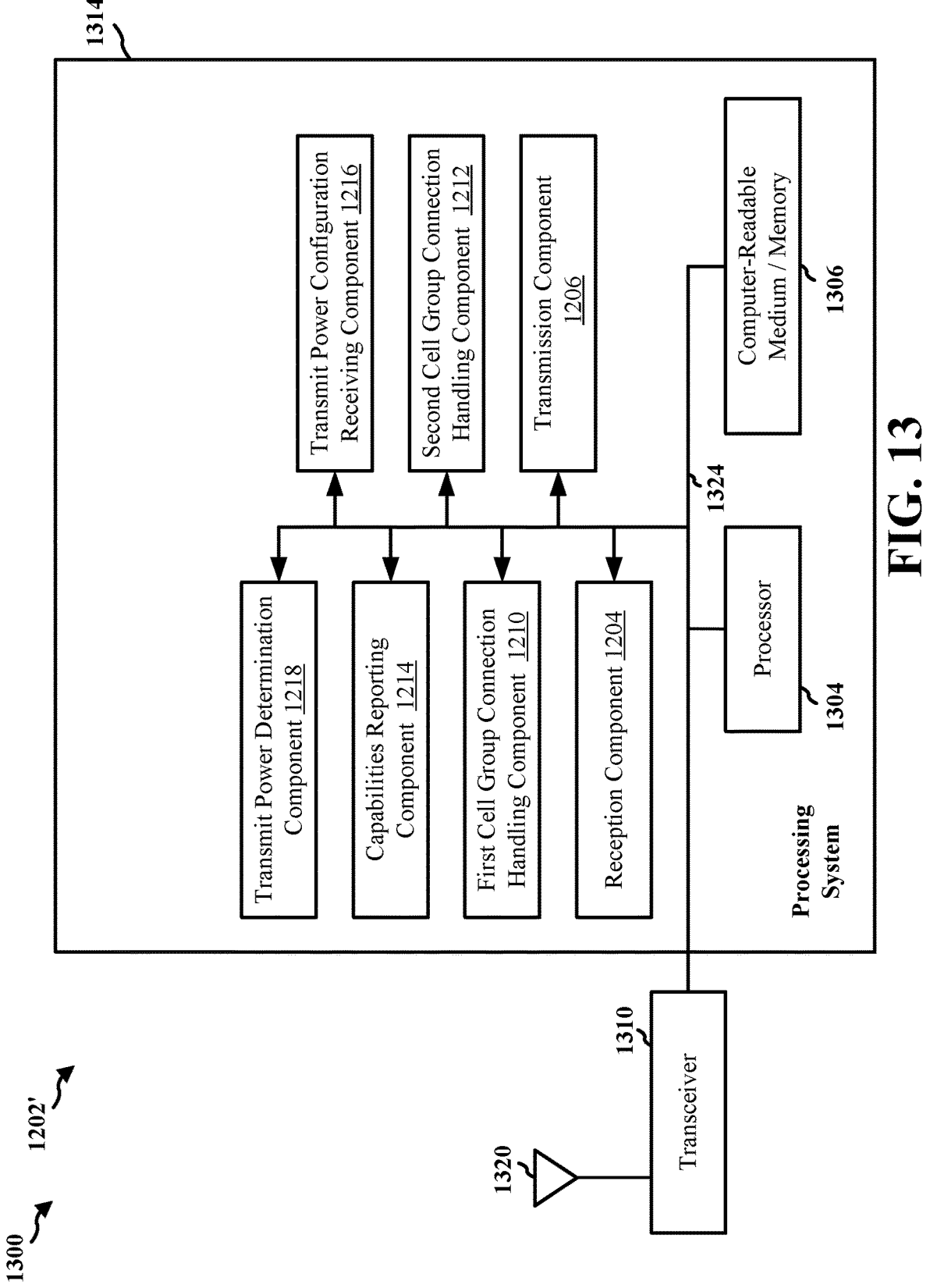
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1210, 1212, 1214, 1216, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see the UE 350 of FIG. 3).

In one configuration, the apparatus 1202/1202' for wireless communication includes means for connecting to an MCG on a first set of MCG serving cells within a first frequency range (FR1) and a second set of MCG serving cells within a second frequency range (FR2), and connecting to an SCG on a first set of SCG serving cells within the FR1 and a second set of SCG bands within the FR2. The apparatus 1202/1202' may also include means for receiving a transmit power configuration for a power control mode for both FR1 and FR2. The apparatus 1202/1202' may also include means for transmitting to at least one of the MCG serving cells or the SCG serving cells with a transmit power determined based on the transmit power configuration. The apparatus 1202/1202' may also include means for transmitting on FR1 to the at least one of the MCG serving cells or the SCG serving cells with a first transmit power determined based on the transmit power configuration for FR1. The apparatus 1202/1202' may also include means for transmitting on FR2 to the at least one of the MCG serving cells or the SCG serving cells with a second transmit power determined based on the same transmit power configuration for FR2. The apparatus 1202/1202' may also include means for transmitting a first capability for indicating support of a first transmit power control method or a second transmit power control method for the FR1. The apparatus 1202/1202' may also include means for transmitting a second capability for indicating support of the first transmit power control method or the second transmit power control method for the FR2.

The apparatus 1202/1202' may also include means for transmitting, for each band combination of one or more band combinations for dual connectivity within the FR1, a first capability for indicating support of a first transmit power control method or a second transmit power control method. The apparatus 1202/1202' may also include means for transmitting, for each band combination of one or more band combinations for dual connectivity within the FR2, a second capability for indicating support of the first transmit power control method or the second transmit power control method. The apparatus 1202/1202' may also include means for connecting to an MCG on a first set of MCG serving cells within one of a first frequency range (FR1) or a second frequency range (FR2), and connecting to an SCG on a first set of SCG serving cells within the FR1 and a second set of SCG serving cells within the FR2. The apparatus 1202/1202' may also include means for receiving a transmit power configuration for a power control mode for FR1 when the first set of MCG serving cells is within FR1 and for FR2 when the first set of MCG serving cells is within FR2. The apparatus 1202/1202' may also include means for transmitting to at least one of the MCG serving cells or the SCG serving cells with a transmit power determined based on the transmit power configuration. The apparatus 1202/1202' may also include means for transmitting on one of FR1 or FR2 to the at least one of the MCG serving cells or the SCG serving cells with a first transmit power determined based on the received transmit power configuration, the transmission being on FR1 when the first set of MCG serving cells is within FR1 and the transmission being on FR2 when the first set of MCG serving cells is within FR2. The apparatus 1202/1202' may also include means for transmitting on the other one of the FR1 or the FR2 to the at least one of the SCG serving cells with a second transmit power determined based on a second transmit power configuration different than the received transmit power configuration, the transmission being on FR1 when the first set of MCG serving cells is within FR2 and the transmission being on FR2 when the first set of MCG serving cells is within FR1. The apparatus 1202/1202' may also include means for transmitting a first capability for indicating support of a first transmit power control method or a second transmit power control method for the FR1. The apparatus 1202/1202' may also include means for transmitting a second capability for indicating support of the first transmit power control method or the second transmit power control method for the FR2. The apparatus 1202/1202' may also include means for transmitting, for each band combination of one or more band combinations for dual connectivity within the FR1, a first capability for indicating support of a first transmit power control method or a second transmit power control method. The apparatus 1202/1202' may also include means for transmitting, for each band combination of one or more band combinations dual connectivity within the FR2, a second capability for indicating support of the first transmit power control method or the second transmit power control method. The apparatus 1202/1202' may also include means for connecting to an SCG on a first set of SCG serving cells within one of a first frequency range (FR1) or a second frequency range (FR2), and connecting to an MCG on a first set of MCG serving cells within the FR1 and a second set of MCG serving cells within the FR2. The apparatus 1202/1202' may also include means for receiving a transmit power configuration for a power control mode for FR1 when the first set of SCG serving cells is within FR1 and for FR2 when the first set of SCG serving cells is within FR2. The apparatus 1202/1202' may also include means for transmitting to at least one of the MCG serving cells or the SCG serving cells with a transmit power determined based on the transmit power configuration. The apparatus 1202/1202' may also include means for transmitting on one of FR1 or FR2 to the at least one of the MCG serving cells or the SCG serving cells with a first transmit power determined based on the received transmit power configuration, the transmission being on FR1 when the first set of SCG serving cells is within FR1 and the transmission being on FR2 when the first set of SCG serving cells is within FR2. The apparatus 1202/1202' may also include means for transmitting on the other one of the FR1 or the FR2 to the at least one of the SCG serving cells with a second transmit power determined based on a second transmit power configuration different than the received transmit power configuration, the transmission being on FR1 when the first set of SCG serving cells is within FR2 and the transmission being on FR2 when the first set of SCG serving cells is within FR1. The apparatus 1202/1202' may also include means for transmitting a first capability for indicating support of a first transmit power control method or a second transmit power control method for the FR1. The apparatus 1202/1202' may also include means for transmitting a second capability for indicating support of the first transmit power control method or the second transmit power control method for the FR2. The apparatus 1202/1202' may also include means for transmitting, for each band combination of one or more band combinations for dual connectivity within the FR1, a first capability for indicating support of a first transmit power control method or a second transmit power control method. The apparatus 1202/1202' may also include means for transmitting, for each band combination of one or more band combinations dual connectivity within the FR2, a second capability for indicating support of the first transmit power control method or the second transmit power control method.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Example 1 is a method of wireless communication of a wireless device at a user equipment, comprising: connecting to a master cell group (MCG) on a first set of MCG serving cells within a first frequency band and a second set of MCG serving cells within a second frequency band, and connecting to a secondary cell group (SCG) on a first set of SCG serving cells within the first frequency band and a second set of SCG bands within the second frequency band; receiving a transmit power configuration for a power control mode for both the first frequency band and the second frequency band; and transmitting to at least one of the MCG serving cells or the SCG serving cells with a transmit power determined based on the transmit power configuration.

In Example 2, the method of Example 1 further includes that the transmitting comprises: transmitting on the first frequency band to the at least one of the MCG serving cells or the SCG serving cells with a first transmit power determined based on the transmit power configuration for the first frequency band; and transmitting on the second frequency band to the at least one of the MCG serving cells or the SCG serving cells with a second transmit power determined based on the transmit power configuration for the second frequency band.

In Example 3, the method of any of Example 1 or Example 2 further includes that the transmit power configuration is a semi-static power control mode.

In Example 4, the method of any of Examples 1 to 3 further includes that the transmit power configuration is a dynamic power control mode.

In Example 5, the method of any of Examples 1 to 4 further includes transmitting a first capability for indicating support of a first transmit power control method or a second transmit power control method for the first frequency band; and transmitting a second capability for indicating support of the first transmit power control method or the second transmit power control method for the second frequency band, wherein the received transmit power configuration for the first frequency band is based on the first capability and the received transmit power configuration for the second frequency band is based on the second capability.

In Example 6, the method of any of Examples 1 to 5 further includes transmitting, for each band combination of one or more band combinations for dual connectivity within the first frequency band, a first capability for indicating support of a first transmit power control method or a second transmit power control method; and transmitting, for each band combination of one or more band combinations for dual connectivity within the second frequency band, a second capability for indicating support of the first transmit power control method or the second transmit power control method, wherein the received transmit power configuration for the first frequency band is based on the first capability and the received transmit power configuration for the second frequency band is based on the second capability.

In Example 7, the method of any of Examples 1 to 6 further includes that the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHz frequency band and the second frequency band comprises a millimeter wave frequency band.

Example 8 is a device including one or more processors and one or more memories in electronic communication with the one or more processors storing instructions executable by the one or more processors to cause a system or an apparatus to implement a method as in any of Examples 1 to 7.

Example 9 is a system or apparatus including means for implementing a method or realizing an apparatus as in any of Examples 1 to 7.

Example 10 is a non-transitory computer-readable medium storing instructions executable by one or more processors to cause the one or more processors to implement a method as in any of Examples 1 to 7.

Example 11 is a method of wireless communication of a wireless device at a user equipment, comprising: connecting to a master cell group (MCG) on a first set of MCG serving cells within one of a first frequency band or a second frequency band, and connecting to a secondary cell group (SCG) on a first set of SCG serving cells within the first frequency band and a second set of SCG serving cells within the second frequency band; receiving a transmit power configuration for a power control mode for the first frequency band when the first set of MCG serving cells is within the first frequency band and for the second frequency band when the first set of MCG serving cells is within the second frequency band; and transmitting to at least one of the MCG serving cells or the SCG serving cells with a transmit power determined based on the transmit power configuration.

In Example 12, the method of Example 11 further includes that the transmitting comprises: transmitting on one of the first frequency band or the second frequency band to the at least one of the MCG serving cells or the SCG serving cells with a first transmit power determined based on the received transmit power configuration, the transmission being on the first frequency band when the first set of MCG serving cells is within the first frequency band and the transmission being on the second frequency band when the first set of MCG serving cells is within the second frequency band; and transmitting on the other one of the first frequency band or the second frequency band to the at least one of the SCG serving cells with a second transmit power determined based on a second transmit power configuration different than the received transmit power configuration, the transmission being on the first frequency band when the first set of MCG serving cells is within the second frequency band and the transmission being on the second frequency band when the first set of MCG serving cells is within the first frequency band.

In Example 13, the method of any of Example 11 or Example 12 further includes that the transmit power configuration is a semi-static power control mode.

In Example 14, the method of any of Examples 11 to 13 further includes that the transmit power configuration is a dynamic power control mode.

In Example 15, the method of any of Examples 11 to 14 further includes transmitting a first capability for indicating support of a first transmit power control method or a second transmit power control method for the first frequency band; and transmitting a second capability for indicating support of the first transmit power control method or the second transmit power control method for the second frequency band, wherein the received transmit power configuration for the first frequency band is based on the first capability and the received transmit power configuration for the second frequency band is based on the second capability.

In Example 16, the method of any of Examples 11 to 15 further includes transmitting, for each band combination of one or more band combinations for dual connectivity within the first frequency band, a first capability for indicating support of a first transmit power control method or a second transmit power control method; and transmitting, for each band combination of one or more band combinations dual connectivity within the second frequency band, a second capability for indicating support of the first transmit power control method or the second transmit power control method, wherein the received transmit power configuration for the first frequency band is based on the first capability and the received transmit power configuration for the second frequency band is based on the second capability.

In Example 17, the method of any of Examples 11 to 16 further includes that the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHZ frequency band and the second frequency band comprises a millimeter wave frequency band.

Example 18 is a device including one or more processors and one or more memories in electronic communication with the one or more processors storing instructions executable by the one or more processors to cause a system or an apparatus to implement a method as in any of Examples 11 to 17.

Example 19 is a system or apparatus including means for implementing a method or realizing an apparatus as in any of Examples 11 to 17.

Example 20 is a non-transitory computer-readable medium storing instructions executable by one or more processors to cause the one or more processors to implement a method as in any of Examples 11 to 17.

Example 21 is a method of wireless communication of a wireless device at a user equipment, comprising: connecting to a secondary cell group (SCG) on a first set of SCG serving cells within one of a first frequency band or a second frequency band, and connecting to a master cell group (MCG) on a first set of MCG serving cells within the first frequency band and a second set of MCG serving cells within the second frequency band; receiving a transmit power configuration for a power control mode for the first frequency band when the first set of SCG serving cells is within the first frequency band and for the second frequency band when the first set of SCG serving cells is within the second frequency band; and transmitting to at least one of the MCG serving cells or the SCG serving cells with a transmit power determined based on the transmit power configuration.

In Example 22, the method of Example 21 further includes that the transmitting comprises: transmitting on one of the first frequency band or the second frequency band to the at least one of the MCG serving cells or the SCG serving cells with a first transmit power determined based on the received transmit power configuration, the transmission being on the first frequency band when the first set of SCG serving cells is within the first frequency band and the transmission being on the second frequency band when the first set of SCG serving cells is within the second frequency band; and transmitting on the other one of the first frequency band or the second frequency band to the at least one of the SCG serving cells with a second transmit power determined based on a second transmit power configuration different than the received transmit power configuration, the transmission being on the first frequency band when the first set of SCG serving cells is within the second frequency band and the transmission being on the second frequency band when the first set of SCG serving cells is within the first frequency band.

In Example 23, the method of any of Example 21 or Example 22 further includes that the transmit power configuration is a semi-static power control mode.

In Example 24, the method of any of Examples 21 to 23 further includes that the transmit power configuration is a dynamic power control mode.

In Example 25, the method of any of Examples 21 to 24 further includes transmitting a first capability for indicating support of a first transmit power control method or a second transmit power control method for the first frequency band; and transmitting a second capability for indicating support of the first transmit power control method or the second transmit power control method for the second frequency band, wherein the received transmit power configuration for the first frequency band is based on the first capability and the received transmit power configuration for the second frequency band is based on the second capability.

In Example 26, the method of any of Examples 21 to 25 further includes transmitting, for each band combination of one or more band combinations for dual connectivity within the first frequency band, a first capability for indicating support of a first transmit power control method or a second transmit power control method; and transmitting, for each band combination of one or more band combinations dual connectivity within the second frequency band, a second capability for indicating support of the first transmit power control method or the second transmit power control method, wherein the received transmit power configuration for the first frequency band is based on the first capability and the received transmit power configuration for the second frequency band is based on the second capability.

In Example 27, the method of any of Examples 21 to 26 further includes that the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHZ frequency band and the second frequency band comprises a millimeter wave frequency band.

Example 28 is a device including one or more processors and one or more memories in electronic communication with the one or more processors storing instructions executable by the one or more processors to cause a system or an apparatus to implement a method as in any of Examples 21 to 27.

Example 29 is a system or apparatus including means for implementing a method or realizing an apparatus as in any of Examples 21 to 27.

Example 30 is a non-transitory computer-readable medium storing instructions executable by one or more processors to cause the one or more processors to implement a method as in any of Examples 21 to 27.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment, comprising:

connecting to: (i) a master cell group (MCG) via a first MCG serving cell within a first frequency band and a second MCG serving cell within a second frequency band, and (ii) a secondary cell group (SCG) via a first SCG serving cell within the first frequency band and a second SCG serving cell within the second frequency band;

receiving, from a device, an indication indicating a first power control mode, as one of a semi-static power control mode or a dynamic power control mode, to use for sharing transmission power between a transmission via the first frequency band to the first MCG serving cell and a transmission via the first frequency band to the first SCG serving cell; and transmitting to at least one of the first MCG serving cell or the first SCG serving cell via the first frequency band according to the first power control mode.

2. The method of claim 1, wherein the method further comprises:

receiving, from the device, an indication of a second power control mode for sharing transmission power between a transmission via the second frequency band to the second MCG serving cell and a transmission via the second frequency band to the second SCG serving cell; and transmitting to at least one of the second MCG serving cell or the second SCG serving cell via the second frequency band according to the second power control mode.

3. The method of claim 1, wherein the first power control mode is the semi-static power control mode.

4. The method of claim 1, wherein the first power control mode is the dynamic power control mode.

5. The method of claim 2, further comprising:

transmitting a first capability indicating support of the first power control mode associated with the first frequency band; and transmitting a second capability indicating support of the second power control mode for the second frequency band.

6. The method of claim 2, further comprising:

transmitting, for each band combination associated with dual connectivity within the first frequency band, a first capability indicating support of the first power control mode; and transmitting, for each band combination associated with dual connectivity within the second frequency band, a second capability indicating support of the second power control mode.

7. The method of claim 1, wherein the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHz frequency band and the second frequency band comprises a millimeter wave frequency band.

8. A user equipment, comprising:
at least one transceiver;
at least one memory comprising instructions; and
at least one processor configured to execute the instructions to cause the user equipment to:
connect to: (i) a master cell group (MCG) via a first MCG serving cell within a first frequency band and a second MCG serving cell within a second frequency band, and (ii) a secondary cell group (SCG) via a first SCG serving cell within the first frequency band and a second SCG serving cell within the second frequency band;
receive, via the at least one transceiver, an indication indicating a first power control mode, as one of a semi-static power control mode or a dynamic power control mode, to use for sharing transmission power between a transmission via the first frequency band to the first MCG serving cell and a transmission via the first frequency band to the first SCG serving cell; and
transmit, via the at least one transceiver, to at least one of the first MCG serving cell or the first SCG serving cell via the first frequency band according to the first power control mode.

9. The user equipment of claim 8, wherein the at least one processor is further configured to cause the user equipment to:
receive, via the at least one transceiver, an indication of a second power control mode for sharing transmission power between a transmission via the second frequency band to the second MCG serving cell and a transmission via the second frequency band to the second SCG serving cell; and
transmit, via the at least one transceiver, to at least one of the second MCG serving cell or the second SCG serving cell via the second frequency band according to the second power control mode.

10. The user equipment of claim 8, wherein the first power control mode is the semi-static power control mode.

11. The user equipment of claim 8, wherein the first power control mode is the dynamic power control mode.

12. The user equipment of claim 9, wherein the at least one processor is further configured to cause the user equipment to:
transmit, via the at least one transceiver, a first capability indicating support of the first power control mode for the first frequency band; and
transmit, via the at least one transceiver, a second capability indicating support of the second power control mode for the second frequency band.

13. The user equipment of claim 9, wherein the at least one processor is further configured to cause the user equipment to:
transmit, via the at least one transceiver for each band combination associated with dual connectivity within the first frequency band, a first capability indicating support of the first power control mode; and transmit, for each band combination associated with dual connectivity within the second frequency band, a second capability indicating support of the second power control mode.

14. The user equipment of claim 8, wherein the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHz frequency band and the second frequency band comprises a millimeter wave frequency band.

15. A method of wireless communication by a user equipment, comprising:
connecting to: (i) a master cell group (MCG) via a first MCG serving cell within a first frequency band, and (ii) a secondary cell group (SCG) via a first SCG serving cell within the first frequency band and a second SCG serving cell within a second frequency band;
receiving, from a device, an indication indicating a first power control mode, as one of a semi-static power control mode or a dynamic power control mode, to use for sharing transmission power between a transmission via the first frequency band to the first MCG serving cell and a transmission via the first frequency band to the first SCG serving cell; and
transmitting to at least one of the first MCG serving cell or the first SCG serving cell via the first frequency band according to the first power control mode.

16. The method of claim 15, wherein the method further comprises:
receiving, from the device, an indication of a second power control mode for non-sharing of transmission power associated with transmissions to the second SCG serving cell via the second frequency band; and
transmitting to the second SCG serving cell via the second frequency band according to the second power control mode.

17. The method of claim 15, wherein the first power control mode is the semi-static power control mode.

18. The method of claim 15, wherein the first power control mode is the dynamic power control mode.

19. The method of claim 16, further comprising:
transmitting a first capability indicating support of the first power control mode associated with the first frequency band; and
transmitting a second capability indicating support of the first power control mode or the second power control mode associated with the second frequency band.

20. The method of claim 16, further comprising:
transmitting, for each band combination associated with dual connectivity within the first frequency band, a first capability indicating support of the first power control mode; and
transmitting, for each band combination associated with dual connectivity within the second frequency band, a second capability indicating support of the first power control mode or the second power control mode.

21. The method of claim 15, wherein the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHz frequency band and the second frequency band comprises a millimeter wave frequency band.

22. A method of wireless communication by a user equipment, comprising:

connecting to: (i) a secondary cell group (SCG) via a first SCG serving cell within a first frequency band, and (ii) a master cell group (MCG) via a first MCG serving cell within the first frequency band and a second MCG serving cell within a second frequency band;

receiving, from a device, an indication indicating a first power control mode, as one of a semi-static power control mode or a dynamic power control mode, to use for sharing transmission power between a transmission via the first frequency band to the first SCG serving cell and a transmission via the first frequency band to the first MCG serving cell; and transmitting to at least one of the first MCG serving cell or the first SCG serving cell via the first frequency band according to the first power control mode.

23. The method of claim 22, wherein the method further comprises:

receiving, from the device, an indication of a second power control mode for non-sharing of transmission power associated with transmissions to the second MCG serving cell via the second frequency band; and transmitting to the second MCG serving cell via the second frequency band according to the second power control mode.

24. The method of claim 22, wherein the first power control mode is the semi-static power control mode.

25. The method of claim 22, wherein the first power control mode is the dynamic power control mode.

26. The method of claim 23, further comprising:

transmitting a first capability indicating support of the first power control mode associated with the first frequency band; and transmitting a second capability indicating support of the first power control mode or the second power control mode associated with the second frequency band.

27. The method of claim 23, further comprising:

transmitting, for each band combination associated with dual connectivity within the first frequency band, a first capability indicating support of the first power control mode; and transmitting, for each band combination associated with dual connectivity within the second frequency band, a second capability indicating support of the first power control mode or the second power control mode.

28. The method of claim 22, wherein the first frequency band corresponds to Fifth-Generation (5G) New Radio (NR) Frequency Range 1 (FR1) and the second frequency band corresponds to 5G NR Frequency Range 2 (FR2), and wherein the first frequency band comprises a sub-6 GHz frequency band and the second frequency band comprises a millimeter wave frequency band.

* * * * *